United States Patent [19]

Forney, Jr.

[11] Patent Number: 4,959,842
[45] Date of Patent: Sep. 25, 1990

[54] SIGNAL CONSTELLATIONS

[75] Inventor: G. David Forney, Jr., Cambridge, Mass.

[73] Assignee: Codex Corporation, Canton, Mass.

[21] Appl. No.: 181,203

[22] Filed: Apr. 13, 1988

[51] Int. Cl.$^5$ ............................................. H04L 27/34
[52] U.S. Cl. ...................................... 375/39; 332/103;
370/110.1; 371/43; 375/42
[58] Field of Search ........................ 375/39, 42, 54, 57;
332/9 R, 10, 103, 104, 106, 115; 370/77, 110.1,
110.4, 119; 371/43, 44; 341/56, 80

[56] References Cited

U.S. PATENT DOCUMENTS

| | | | |
|---|---|---|---|
| 3,805,191 | 4/1974 | Kawai et al. | 375/42 X |
| 4,495,477 | 1/1985 | Weber | 375/42 |
| 4,538,284 | 8/1985 | Lang et al. | 375/39 |
| 4,562,426 | 12/1985 | Forney, Jr. | 375/58 |
| 4,630,287 | 12/1986 | Armstrong | 375/39 |
| 4,713,817 | 12/1987 | Wei | 371/43 |

OTHER PUBLICATIONS

IEEE Transactions on Information Theory; vol. IT-29, No. 6, Nov. 1983, PP820-824; Conway and Sloane, "A Fast Encoding Method for Lattice Codes and Quantizers".
IEEE Journal on Selected Areas in Communications, vol. SAC-2, No. 5, Sep. 1984, Forney et al.; "Efficient Modulation for Band-Limited Channels", pp. 632-647.
IEEE Transactions on Information Theory; vol. IT-28, No. 2, Mar. 1982, pp. 227-232, Conway & Sloane, "Fast Quantizing and Decoding Algorithms for Lattice Quantizers and Codes".
IEEE Transactions on Information Theory; vol. IT-32, No. 1, Jan. 1986, pp. 41-50, "Soft Decoding Techniques for Codes and Lattices, Including the Golay Code and Leech Lattice".
IEEE Transactions on Communications, vol. COM-21, No. 10, Oct. 1973, pp. 1108-1115; Simon and Smith, "Hexagonal Multiple Phase-and-Amplitude-Shift Keyed Signal Sets".

Primary Examiner—Benedict V. Safourek
Attorney, Agent, or Firm—Fish & Richardson

[57] ABSTRACT

A Voronoi signal constellation with ties includes those points of a lattice $\Lambda$ (or a coset $\Lambda+c$) that lie within a Voronoi region of a sublattice $\Lambda'$ of $\Lambda$, $\Lambda'$ being other then a scaled version of $\Lambda$, and the constellation includes more than $|\Lambda/\Lambda'|$ points, where $|\Lambda/\Lambda'|$ is the order of the lattice partition $\Lambda/\Lambda'$. In order aspects, the lattices $\Lambda$ and $\Lambda'$ are of dimension greater than two; the sublattice $\Lambda'$ is a version of a binary lattice of depth at least two and normalized informativity less than one; a method is provided of mapping from m data bits to a point drawn from a Voronoi constellation of more than $2^m$ points, based on an N-dimensional lattice partition $\Lambda/\Lambda'$; and Voronoi constellations are provided comprising points of a lattice $\Lambda$ (or a coset $\Lambda+c$) that lie within a Voronoi region of a sublattice $\Lambda'$ of $\Lambda$, the sublattice $\Lambda'$ comprising a binary lattice of depth two and normalized informativity less than one. Such sublattices $\Lambda'$ are also useful in lattice quantizers.

31 Claims, 10 Drawing Sheets

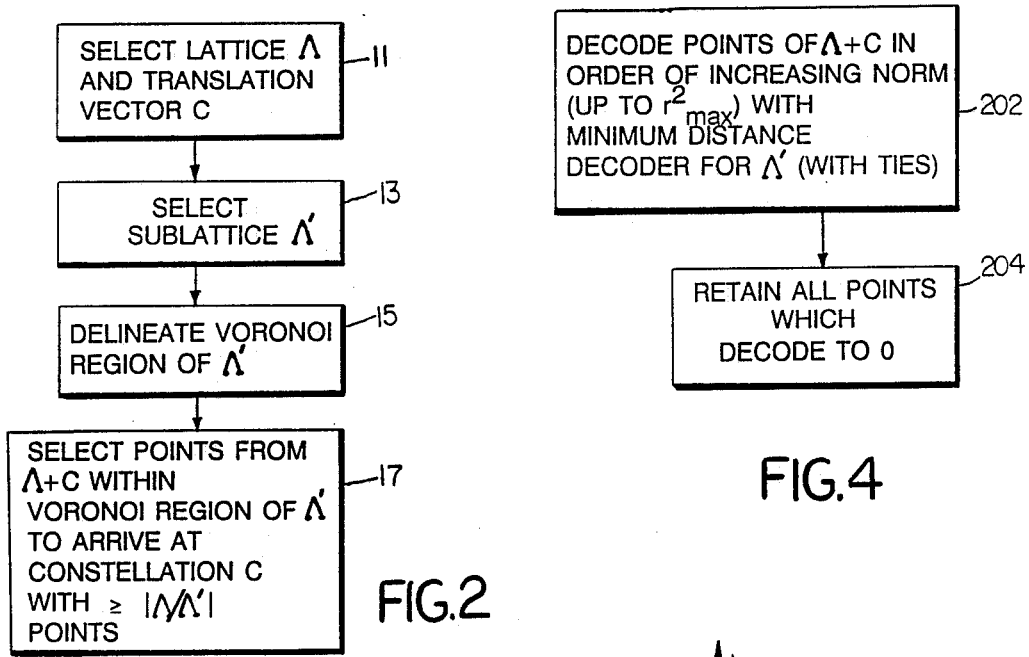
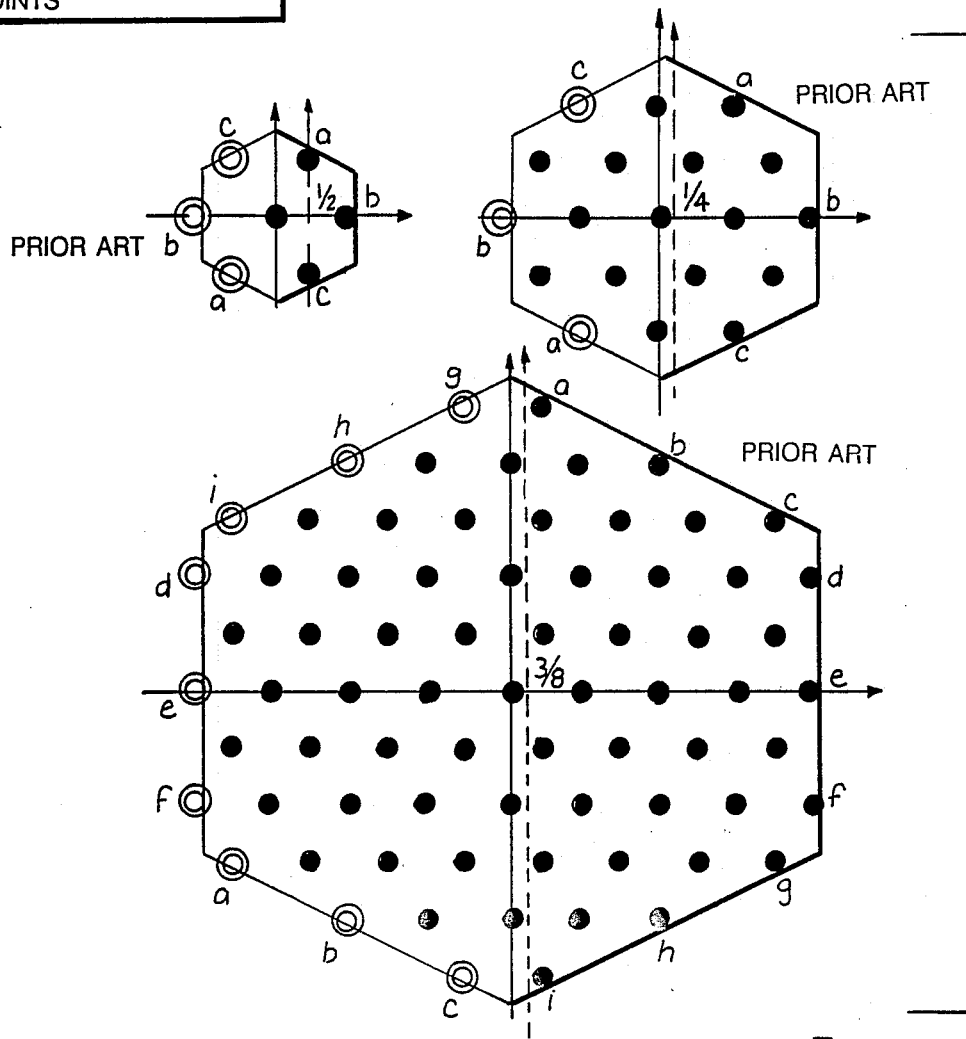

SIGNAL CONSTELLATIONS

BACKGROUND OF THE INVENTION

This invention relates to signal constellations for communication systems.

In communication systems using modems, for example, data is sent over a noise-affected channel by modulating a carrier in accordance with a series of signal points drawn from a constellation of available signal points. In a quadrature amplitude modulation (QAM) system, the constellation is two-dimensional. It is known that certain advantages can be achieved using higher-dimensional constellations to define the points to be transmitted.

An N-dimensional (N greater than 2) constellation C is a finite set of N-tuples (i.e., points each having N coordinates that together define a location in N-space). Important characteristics of such a constellation are the number $|C|$ of its points, the minimum squared distance $d_{min}^2$ (C) between its points, and its average energy (or average Euclidean norm) P(C). For a given number of points, a figure of merit of a constellation when used for signaling is $P(C)/d_{min}^2$ (C) (the smaller, the better).

A general known method of constructing a good constellation (one with a small figure of merit) having a desired number of points is to choose a finite set of points from a so-called dense (tightly packed) N-dimensional lattice $\Lambda$, or from a coset of $\Lambda$ (i.e., a translated version of $\Lambda$). The points may be selected by defining a region R in N-space that is just large enough to contain the desired number of points. The minimum squared distance $d_{min}^2$ (C) of the constellation is the minimum squared distance $d_{min}^2$ ($\Lambda$) of the lattice $\Lambda$; in general, to minimize the average energy P(C), the region R should resemble as nearly as possible an N-sphere centered on the origin.

Conway and Sloane, "A Fast Encoding Method for Lattice Codes and Quantizers," IEEE Trans. Inform. Theory, Vol. IT-29, pp. 820–824, 1983, incorporated herein by reference, propose the following way to define such a region R containing the desired number of points. Suppose that a given N-dimensional lattice $\Lambda$ has as a sublattice a scaled version $M\Lambda$ of the same lattice, where M is an integer scaling factor. That is, the sublattice is a subset of the points of the lattice selected so that the sublattice will be simply a larger scale version of the lattice. (Note that $M\Lambda$ and $\Lambda$ are lattices of the same type.) Then there are $M^N$ equivalence classes of points in the original lattice $\Lambda$ (or any coset of $\Lambda$) modulo $M\Lambda$. Note that two N-tuples are equivalent modulo $M\Lambda$ (and hence belong to an equivalence class) if their difference is a point in $M\Lambda$.

In accordance with Conway and Sloane, the so-called Voronoi region of the lattice $M\Lambda$ is the set of points in N-space that are at least as close to the origin as to any other lattice point in $M\Lambda$. The interior of the Voronoi region may be defined as the set of points closer to the origin than to any other lattice point; the boundary of the Voronoi region is the set of points for which the origin is one of the closest points in the lattice, but for which there are other equally near lattice points. In general, the boundary is a closed surface in N-space, composed of a certain number of (N-1)-dimensional faces, which are portions of hyperplanes equidistant between two neighboring lattice points in $M\Lambda$. (For example, the Voronoi region of an N-dimensional integer lattice $Z^N$ is an N-cube of side 1, whose faces are (N-1)-cubes of side 1. The intersections of the faces are figures of N-2 or fewer dimensions and have more than two nearest neighbors.)

Therefore, if $\Lambda+c$ is a coset of the original lattice (where c is a translation vector) that is chosen to have no points on the boundary of the Voronoi region of the scaled lattice $M\Lambda$, then the Voronoi region contains $M^N$ points of the coset $\Lambda+c$, one from each equivalence class modulo $M\Lambda$, and the $M^N$ point Voronoi region may serve as a signal constellation called a Voronoi constellation (Conway and Sloane call it a Voronoi code). Such constellations are characterized by relatively small average energy and are shown by Conway and Sloane to have a straightforward implementation.

In my copending patent application, Signal Constellations, U.S. Ser. No. 062,497, filed June 12, 1987, assigned to the same assignee as this application, incorporated by reference, I disclosed using a constellation comprising points of a lattice $\Lambda$ (or a coset of $\Lambda$) that lie within a Voronoi region of a sublattice $\Lambda'$ of $\Lambda$, where $\Lambda'$ is other than a scaled version of $\Lambda$. There the constellation was based on a maximally biased selection of possibly fewer than all points in the Voronoi region, with some points possibly lying on a boundary of the Voronoi region.

Such an arrangement has a number of advantages. Constellations having a number $|\Lambda/\Lambda'|$ of points other than simply the $N^{th}$ power of an integer ($M^N$) may be constructed, where $|\Lambda/\Lambda'|$ the order of the partition (index of the quotient group). Even if the original lattice $\Lambda$ is not a dense lattice (e.g., the N-dimensional integer lattice $Z^N$), which may have advantages in certain coding schemes (e.g., coset codes), the Voronoi region of a dense lattice $\Lambda'$ may be used to define the boundary of the constellation, thus achieving the advantage of a quasi-spherical constellation. The method of mapping data words to Voronoi constellation points is straightforward to implement.

Lang et al., U.S. Pat. No. 4,538,284, issued Aug. 27, 1985, discloses two-dimensional symmetrical hexagonal constellations. For example, one such constellation contains 73 points including a 64-point suboptimal constellation (of the kind shown in Forney, et al., "Efficient Modulation for Band-Limited Channels", IEEE J. Select. Areas Commun., Vol SAC-2, pp. 632–647, 1984). Fifty-five of the points correspond to unique ones of the 64 possible data words; the remaining 18 points are grouped in pairs, each pair corresponding to one of the 9 remaining data words; when one of these data words occurs there is a further choice of one point of the corresponding pair, which can be used to support a secondary channel.

SUMMARY OF THE INVENTION

The invention achieves improved data communication by providing so-called "Voronoi constellations with ties" having certain properties. In one general feature, the Voronoi constellation with ties comprises points of a lattice $\Lambda$ (or a coset $\Lambda+c$) that lie within a Voronoi region of a sublattice $\Lambda'$ of $\Lambda$, $\Lambda'$ being other than a scaled version of $\Lambda$, and the constellation includes more than $|\Lambda/\Lambda'|$ points, where $|\Lambda/\Lambda'|$ is the order of the lattice partition $\Lambda/\Lambda'$.

In another general feature, the Voronoi constellation with ties comprises points of a lattice $\Lambda$ (or a coset $\Lambda+c$) that lie within a Voronoi region of a sublattice $\Lambda'$ of $\Lambda$, the lattices $\Lambda$ and $\Lambda'$ having dimension greater than two, and as before the constellation includes more than $|\Lambda/\Lambda'|$ points, where $|\Lambda/\Lambda'|$ is the order of the lattice partition $\Lambda/\Lambda'$.

In another general feature, the Voronoi constellation comprises points of a lattice $\Lambda$ (or a coset $\Lambda+c$) that lie within a Voronoi region of a sublattice $\Lambda'$ of $\Lambda$, $\Lambda'$ being a version of a binary lattice of depth (defined below) at least 2 and normalized informativity (defined below) less than one.

Preferred embodiments of the invention include the following features. The value c is selected so that the constellation has some predetermined symmetry relative to the origin (e.g., three-way, four-way, or six-way rotational symmetry). The constellation includes all points of $\Lambda$ within the Voronoi region, including boundary points in $\Lambda$ (or $\Lambda+c$). At least one data element is encoded into any one of at least two different boundary points of the constellation, with equal probability, based, for example, on a secondary stream of data (thereby providing an opportunistic secondary channel for the secondary stream). Sublattice $\Lambda'$ is of a different type than lattice $\Lambda'$. The series of signal points is selected based on a coset code. The lattice $\Lambda$ may be a version of an integer lattice $Z^N$, N an integer, or a ternary or quaternary lattice whose constituent 2D lattice is a version of a hexagonal lattice $\Lambda_2$. The sublattice $\Lambda'$ may be a version of the Schläfli lattice $D_4$. The constellation is 16-, 24-, or 32 dimensional; the lattice $\Lambda$ has an 8-state or 16-state trellis diagram; the lattice $\Lambda$ is based on a partition $E_8/RD_8^*$; the lattice $\Lambda'$ comprises the depth-2 lattice $H_{16}^* = \Lambda_{(16,5)}$ where (16,5) is a first-order Reed-Muller code, or a depth-2 lattice $X_{24}^* = \Lambda_{(24,6)}$, or a depth 2 lattice $\Lambda_{(32,7)}$.

Another general feature of the invention is a method of mapping from m data bits to a point drawn from a Voronoi constellation of more than $2^m$ points, based on an N-dimensional lattice partition $\Lambda/\Lambda'$; the method includes mapping the m-bit data word to one of $2^m$ initial points x, each initial point x consisting of N coordinates $(x_1, \ldots, x_N)$, each coordinate taking on one of a predetermined set of values, the number of elements in all such sets of coordinate values not being identical, each initial point being a point in a coset of A that belongs to a distinct equivalence class modulo A ; decoding (quantizing) the point x into a lattice point $\lambda$ in $\Lambda'$; and deriving the apparent error $e = x - \lambda$ (or a translate $e - c$ of such apparent error). The point to be transmitted is then e, if e corresponds to only a single signal point; otherwise e determines a set [e] of equivalent constellation points from among which is drawn the constellation point to be transmitted.

In another general feature of the invention, the binary lattices $\Lambda'$ of depth 2 and normalized informativity less than one (particularly mentioned above) are also useful in so-called lattice quantizers (defined below), in which a real N-tuple r in N-space is decoded (quantized) to the closest point $\lambda$ in $\Lambda'$. They can yield a near-optimal mean squared error $\|e\|^2$ for their dimension, where the quantizing error e is defined as $r - \lambda$, but can be more easily decoded than optimal lattices.

In addition to the advantages of the Voronoi constellations disclosed in my copending patent application, the Voronoi constellations of this invention in some cases are more practical to implement (while being only slightly suboptimum in terms of average energy P(C)), have greater symmetry, and offer the possibility of supporting an opportunistic secondary channel. Generating constellations based on lattices whose normalized informativity is less than one can yield near-optimal shape gains for their dimension with reduced constellation expansion ratio (defined below) and peak-to-average ratio (defined below) of the constituent 2D constellation (defined below), and in addition relatively low implementation complexity.

Other advantages and features will become apparent from the following description of the preferred embodiment, and from the claims.

DESCRIPTION OF THE PREFERRED EMBODIMENT

We first briefly describe the drawings.

FIGS. 1 and 2 are flow-charts for forming Voronoi constellations without ties and with ties, respectively.

FIGS. 3 and 4 are flow-charts for generating fundamental regions for Voronoi constellations without and with ties, respectively.

FIG. 5 shows three Voronoi-type constellations with and without ties.

GENERAL METHOD OF FORMING VORONOI CONSTELLATION

My copending patent application disclosed certain kinds of what we may call Voronoi constellations without ties, in which the number of points is $|\Lambda/\Lambda'|$. The present invention principally concerns certain kinds of what we shall call Voronoi constellations with ties, in which the number of points is greater than $|\Lambda/\Lambda'|$. It also focuses on certain lattices $\Lambda'$ that are useful for both kinds of Voronoi constellations, as well as with lattice quantizers.

Preliminarily, we state a general method of generating optimal Voronoi constellations.

We first define a fundamental region of an N-dimensional lattice $\Lambda$ as a region of N-space that contains one and only one point from every equivalence class of N-tuples modulo $\Lambda$. Every fundamental region of $\Lambda$ has the same volume $V(\Lambda)$ in N-space.

The Voronoi region of a lattice $\Lambda$ (the set of N-tuples at least as close to the origin 0 as to any point $\lambda$ in $\Lambda$) contains a fundamental region of $\Lambda$, consisting of all points in the interior plus a subset of points on the boundary such that the subset contains one and only one point from each equivalence class modulo $\Lambda$. In fact, the boundary of the Voronoi region must also contain additional points not in such a fundamental region.

Let $\Lambda$ be a lattice, c any N-tuple, $\Lambda'$ any sublattice of $\Lambda$, and $|\Lambda/\Lambda'|$ the order (index) of the lattice partition (quotient group) $\Lambda/\Lambda'$. The points in $\Lambda+c$ that lie in the Voronoi region of $\Lambda'$ will form the basis of a Voronoi constellation. If R is a fundamental region of $\Lambda'$ that includes the interior of the Voronoi region of $\Lambda'$ as well as a subset of the boundary, then R contains precisely $|\Lambda/\Lambda'|$ points of $\Lambda+c$ which form a $|\Lambda/\Lambda'|$-point Voronoi constellation.

VORONOI CONSTELLATION WITHOUT TIES

Figure 1:
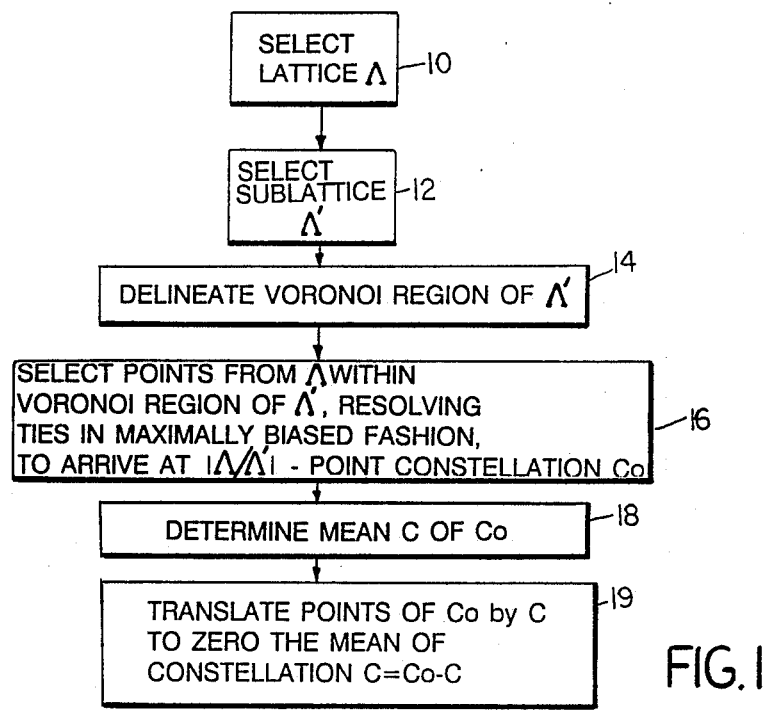

The boundary of the Voronoi region includes more points than are needed to complete a fundamental region R, and, in my copending patent application, a choice is made among points on the boundary. The choice is preferably made by a tie-breaking process in such a way that the selected points are (as we said) maximally biased. Referring to FIG. 1, in summary, the process of forming the Voronoi constellation without ties involves selecting a lattice $\Lambda$ (10)-; selecting an appropriate sublattice $\Lambda'$ (12); delineating the Voronoi region of the sublattice (14); resolving ties by selecting one point from each equivalence class on the boundary of the Voronoi region to generate a $|\Lambda/\Lambda'|$-point constellation $C_0$, representing points of $\Lambda$ that lie within a fundamental region R of $\Lambda'$ (16), preferably in a maximally biased fashion; determining the mean c of $C_0$ (18); and translating points of the constellation $C_0$ by c to create a constellation $C = C_0 c$ for which the mean is 0 (19).

VORONOI CONSTELLATION WITH TIES

According to the present invention, in an alternative technique for generating Voronoi constellations, the boundary ties are not broken, resulting in Voronoi constellations with ties. In this alternative technique (FIG. 2), a lattice $\Lambda$ and the translation vector c are chosen initially to yield a phase-symmetric coset $\Lambda+c$ of the lattice $\Lambda$ (11). As in FIG. 1, a sublattice $\Lambda'$ of $\Lambda$ is chosen (13) and its Voronoi region determined (15). The constellation C then consists of all points in $\Lambda+c$ that lie within this Voronoi region (17), which will in general be more than $|\Lambda/\Lambda'|$ points because of boundary ties. Sets of boundary points in $\Lambda+c$ that are congruent mod $\Lambda'$ are used with equal probability, so as maintain all desired symmetry, and possibly to support an opportunistic secondary channel, as explained below.

LATTICE DECODERS (QUANTIZERS)

A decoder (or quantizer) of a lattice $\Lambda$ is a map from at least some points r in N-space to lattice points $\lambda$ in the lattice $\Lambda$. An exhaustive decoder is one that maps every point in N-space to a lattice point. A minimum-distance decoder is a map that always yields a lattice point nearest to r. A fair decoder is a decoder such that if r is mapped to $\lambda$, and $\lambda'$ is any lattice point, then $r+\lambda'$ is mapped to $\lambda+\lambda'$.

A fundamental region R of $\Lambda'$ that contains the interior of a Voronoi region of $\Lambda'$ can be used to define a fair, exhaustive, minimum-distance (FEMD) decoder as follows. Every point r in N-space (whether or not in region R) is equivalent to a unique point e in R, and is thus equal to a unique $e+\lambda$ for some lattice point $\lambda$ of $\Lambda'$. The mapping that associates this $\lambda$ with each r is the desired decoder.

Conversely, any FEMD decoder of $\Lambda'$ defines a fundamental region R of $\Lambda'$ that contains the interior of a Voronoi region of $\Lambda'$: namely, the set of all points r that map to 0. More generally, in the case of ties, a minimum-distance decoder may indicate all the nearest points in $\Lambda'$ to r; then the set of all points for which one of the decoder outputs is 0 is the entire Voronoi version of $\Lambda'$.

Efficient minimum-distance decoders are already known for many lattices (see, e.g., Conway and Sloane, "Fast Quantizing and Decoding Algorithms for Lattice Quantizers and Codes", IEEE Trans. Inform. Theory, Vol. IT-28, pp. 227-232, 1982; Forney et al., "Efficient Modulation for Band-Limited Channels", IEEE J. Select. Areas Commun., vol. SAC-2, pp. 632-647, 1984; Conway and Sloane, "Decoding Techniques for Codes and Lattices, Including the Golay Code and the Leech Lattice", IEEE Trans. Inform. Theory, vol. IT-32, pp. 41-50, 1986; and Forney, U.S. patent application Ser. No. 828,397, filed Feb. 11, 1986, assigned to the same assignee as this application; all incorporated herein by reference.) These known decoders can be used both to efficiently construct Voronoi constellations and to map from data symbols to constellation points in such constellations.

CONSTRUCTION

Figure 3:
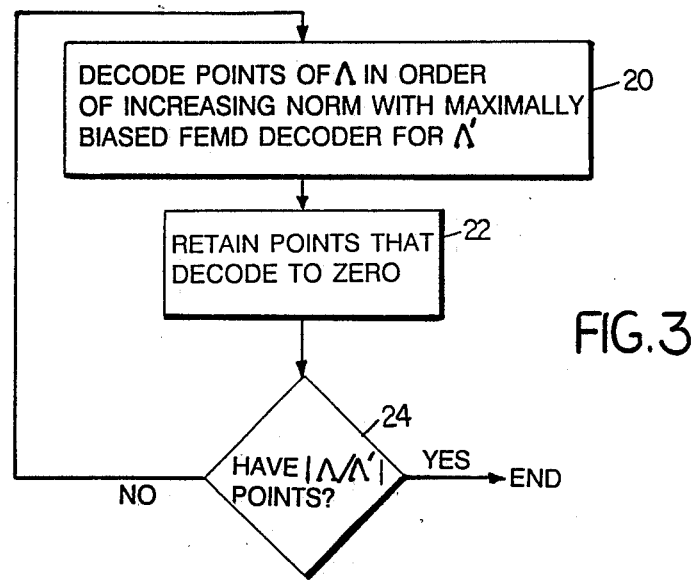

Referring to FIG. 3, to construct a Voronoi constellation without ties, given a lattice $\Lambda$, a sublattice $\Lambda'$, and a maximally biased FEMD decoder for $\Lambda'$, we may decode the points of $\Lambda$ in order of increasing norm (20), retaining (22) those which decode to 0, and discarding all those that do not decode to 0 (22), until we obtain $|\Lambda/\Lambda'|$ points, one point from each equivalence class (24). This yields the untranslated constellation $C_0$.

To construct a Voronoi constellation with ties, given a coset $\Lambda+c$ of a lattice $\Lambda$ and a sublattice $\Lambda'$, we use a minimum distance decoder that has no tie-breaking rule, but indicates all nearest points. Referring to FIG. 4, we simply decode points of $\Lambda+c$ in order of increasing norm (202), and retain all points which decode to 0 (204), including boundary points that are equally close to two or more points of $\Lambda'$. Only points of $\Lambda+c$ that have norms less than or equal to the maximum norm $r_{max}^2$ of any point in the Voronoi region of $\Lambda'$ need be considered.

MAPPING

Conway and Sloane note that when $\Lambda'=M\Lambda$, each of the $M^N$ N-tuples of integers modulo M maps to a different equivalence class of $\Lambda+c$ modulo $M\Lambda$, where the map is to an initial point x which is the sum of the products of the coordinates of the N-tuples with the N generators of $\Lambda$, plus c. A minimum-distance decoder for $M\Lambda$ may then map the initial point x to the closest point $\lambda$ in $\Lambda'$, and the apparent error $e = x - \lambda$ is an equivalent point mod $M\Lambda$ in the Voronoi constellation. This is an efficient map from a data word, represented as an N-tuple of integers modulo M, to points in a Voronoi constellation C consisting of the points in $\Lambda+c$ that lie in the Voronoi region of $M\Lambda$. (Conway and Sloane choose c so that there are no boundary ties.)

Returning to the case of a general sublattice $\Lambda'$ (where $\Lambda'$ is not necessarily $M\Lambda$), if a similarly simple map is known from one of $|\Lambda/\Lambda'|$ data words to initial points x in the $|\Lambda/\Lambda'|$ different equivalence classes of $\Lambda$ modulo $\Lambda'$, this map plus an efficient mimimum distance decoder makes an efficient map from data words to points in a Voronoi constellation C.

To map from initial points x to constellation points (the initial points x are called coset representatives of the $|\Lambda/\Lambda'|$ cosets of $\Lambda'$ in $\Lambda$) in a Voronoi constellation with ties, the decoder can be an ordinary minimum-distance decoder for $\Lambda'$ (with ties) followed by a selection of one of $|e|$ points if the error e is a boundary point of the Voronoi region of $\Lambda'$, where $|e|$ is the number of points equivalent to e, mod Λ'. The points in such an equivalence class [e] may be chosen at random with probability $1/|e|$ whenever the initial point x specifies the corresponding equivalence class, or the points in class [e] can be used to support an opportunistic secondary channel by sending a nominal $\log_2 |e|$ bits each time initial point x specifies class [e]. In other respects, the Voronoi constellations with ties can be encoded and decoded in the same way as Voronoi constellations without ties. In particular, there is no ambiguity at the receiver in interpreting a point in a class [e] as signifying a particular initial point x.

THE TWO-DIMENSIONAL HEXAGONAL LATTICE $A_2$ WITHOUT TIES

As an example of a two-dimensional Voronoi constellation without ties, consider the two-dimensional hexagonal lattice $A_2$, defined as the set of all points that are sums of integer products of the two generators (1,0) and $(\frac{1}{2}, \sqrt{3}/2)$. In this form it has $d_{min}^2 = 1$.

The 4-point, 16-point, and 64-point constellations $C_0$ corresponding to the lattice partitions $A_2/2A_2$, $A_2/4A_2$, and $A_2/8A_2$ are depicted in FIG. 5, with the associated fundamental region of $A_2$. In each case, the solid dots represent points in $C_0$, the hollow double lined dots represent points in the Voronoi region of the sublattice $MA_2$ but not in the fundamental region, and the solid and dotted lines represent the boundary of the constellation. The axes of the constellation $C_0$ are shown solid; the Y-axis of the translated constellation C is shown dashed. These constellations respectively have average power $P(C_0)$ of $\frac{3}{4} = 0.75$ (−1.25 dB), $9/4 = 2.25$ (3.52 dB), and 9 (9.54 dB); their means are $c = (\frac{1}{2},0)$, $(\frac{1}{4},0)$, and $(\frac{1}{8},0)$; and thus the corresponding maximally biased Voronoi constellations C have average power P(C) equal to $\frac{1}{2} = 0.5$ (−3.01 dB), $35/16 = 2.19$ (3.40 dB), and $567/64 = 8.86$ (9.47 dB). (The estimates for P(C) given by the "integral approximation" (continuous approximation) of Forney et al., "Efficient Modulation for Band Limited Channels," cited above, are, 0.56 (−2.55 dB), 2.22 (3.47 dB), and 8.89 (9.49 dB), respectively.) The 4-point $A_2/2A_2$ constellation without ties is old. The 16-point $A_2/4A_2$ constellation without ties is shown in Conway and Sloane, "A Fast Encoding Method . . . ", cited above and in earlier work. A non-Voronoi 64-point constellation with slightly better P(C) is shown in Forney et al., "Efficient Modulation . . . ". The 64-point Voronoi constellation of FIG. 5 is shown in my copending application.

WITH TIES

The constellations without ties of FIG. 5 can be expanded to form Voronoi constellations with ties by including in each of them the additional boundary points shown as double lined dots, and leaving the y axis in its original (solid line) location. The constellations with ties have respectively 7, 19, and 73 points, including 6, 6, and 18 boundary points occurring in pairs (indicated by lower case letters). The 19- and 73-point constellations are like those shown in the Lang patent, FIGS. 4e and 4g. The average powers remain as for the constellations without ties, but now opportunistic secondary channels are available (via the pairs of boundary points) at rates of $\frac{3}{8}$, 3/16, and 9/64 bits per two dimensions, respectively; and the constellations have desirable six-way symmetry. The costs in average power to provide the secondary channel are only 1.76 dB, 0.12 dB, and 0.07 dB, respectively.

A 4-DIMENSIONAL VORONOI CONSTELLATION

In my copending patent application, I considered a Voronoi constellation without ties based on the four-dimensional Schläfli lattice $D_4$ (defined as the set of all integer 4-tuples containing an even number of odd integers), and I described a simple minimum-distance decoding method for $D_4$ (see Conway and Sloane "A Fast Encoding Method . . . ", and Forney et al., both cited above).

I also showed that, for a 512-point Voronoi constellation without ties, based on the lattice partition $Z^4/D_4$, $P(C_0) = 233/32 = 7.28$ (8.62 dB), $c = (\frac{1}{2}, 11/32, 3/16, 0)$, so $||c||^2 = 413/1024 = 0.40$, and $P(C) = 7043.1024 = 6.88$ (8.37 dB). (The asymptotic estimate for P(C) given by the "integral approximation" method is 6.93 (8.41 dB), so that already at 512 points P(C) is within 0.04 dB of the asymptote.)

In the present invention, we can construct a quadrilaterally symmetric Voronoi constellation with ties by selecting points from the grid $Z^4 + (\frac{1}{2}, \frac{1}{2}, \frac{1}{2}, \frac{1}{2})$. The translation vector $c = (\frac{1}{2}, \frac{1}{2}, \frac{1}{2}, \frac{1}{2})$ is chosen to give 4-way phase symmetry. Table 1 gives such a constellation based on the 512-way partition $Z^4/4D_4$. The shape is the absolute value of the coordinates, multiplied by 2; e.g., any point $(\pm\frac{1}{2}, \pm\frac{1}{2}, \pm\frac{1}{2}, \pm\frac{1}{2})$ has shape [1111]. The norm $r^2$ is unscaled; n is the total number of points in $Z^4 + (\frac{1}{2}, \frac{1}{2}, \frac{1}{2}, \frac{1}{2})$ of that shape that can be obtained by permutations and sign changes; # is the number of nearest neighbors in $4D_4$ to any 4-tuple of that shape and indicates the number of points associated with a single initial point x. The mean of all points of any given shape is 0, so the whole constellation has zero mean and is symmetric about the origin 0.

TABLE 1

| Voronoi constellation with ties determined by the 512 $Z^4/4D_4$ [and $c = (\frac{1}{2}, \frac{1}{2}, \frac{1}{2}, \frac{1}{2})$] | | | | |
|---|---|---|---|---|
| shape | $r^2$ | n | # | n/# |
| 1111 | 1 | 16 | 1 | 16 |
| 1113 | 3 | 64 | 1 | 64 |
| 1133 | 5 | 96 | 1 | 96 |
| 1333 | 7 | 64 | 1 | 64 |
| 3333 | 9 | 16 | 1 | 16 |
| 1115 | 7 | 64 | 1 | 64 |
| 1135 | 9 | 192 | 2 | 96 |
| 1335 | 11 | 192 | 3 | 64 |
| 3335 | 13 | 64 | 4 | 16 |
| 1117 | 13 | 64 | 4 | 16 |
| | | | | 512 |

Figure 6:
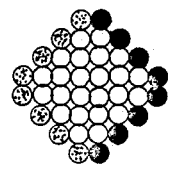
FIG. 6 shows a Voronoi constellation with ties.

The projection of C onto any two dimensions is called the constituent two-dimensional constellation $C_2$ of C. For this four dimensional Voronoi constellation with ties, $C_2$ is the two-dimensional Voronoi constellation with ties based on the 32-way partition $Z^2/4RZ^2$ that is illustrated in FIG. 6, which has 40 points in all, including 16 boundary points and 24 interior points. [The rotation operator R is defined by the 2×2 matrix = [(1,1), (−1,1)] and geometrically is a rotation by 45° with a scaling by a factor of $2^{\frac{1}{2}}$.]

From Table 1 we can determine that $P(C) = 232/64 = 3.625$ (5.59 dB) per two dimensions, about 0.23 dB worse than the 512-point Voronoi constellation without ties. However, we now have quadrilateral symmetry and the possibility of a secondary channel of average rate about $\frac{1}{4}$ bit per two dimensions (if we assume that # = 3 corresponds to 3/2 bit of secondary channel information). The peak-to-average ratio of C is 13/2 P(C)=1.79 in 4 dimensions, and 12.5/P(C)=3.45 in two dimensions, since the two-dimensional point of greatest energy is (7/2, ½); these values are close to those of the maximally biased constellation discussed in my copending application.

For the partitions $Z^4/2D_4$ and $Z^4/8D_4$, the same construction yields constellations with ties with average power per two dimensions of P(C)=1 (0 dB) and 449/32=14.03 (11.47 dB), respectively.

Another family of Voronoi constellations with ties with $D_4$-type boundaries arises from the sequence that begins with $Z^4/RD_4$, $Z^4/2RD_4$, and $Z^4/4RD_4$. These constructions have average power per two dimensions of P(C)=½ (−3.01 dB), 7/4 (2.43 dB), and 111/16 (8.41 dB).

USE OF 4-DIMENSIONAL VORONOI CONSTELLATIONS

As I described in my copending patent application, Voronoi constellations derived from lattice partitions of the form $Z^4/\Lambda'$, where $\Lambda'$ is a scaled version of $D_4$ or $RD_4$, such as the constellation based on the partition $Z^4/4D_4$ just described, are useful, for example, with the trellis-coded modulation codes of the kind disclosed and claimed in Wei, U.S. Pat. No. 4,713,817, issued Dec. 15, 1987, assigned to the same assignee as this invention, and incorporated by reference. Constellations with ties have phase symmetries that permit differential coding techniques, and also can support an opportunistic secondary channel.

The Wei codes are so-called coset codes based on partitions of binary lattices. A coset code is defined by an N-dimensional lattice $\Lambda$, an N-dimensional sublattice L of $\Lambda$, where the partition (quotient group) $\Lambda/L$ has order $2^{k+r}$, a rate-k/(k+r) binary encoder E and a $2^{n+r}$ point signal constellation C of points in a coset of $\Lambda$, comprising $2^{k+r}$ subjects $2^{n-k}$ points each, each such subset consisting of points in a distinct coset of L. In the case of a constellation with ties, the constellation C may contain more than $2^{n+r}$ points.

Figure 7:
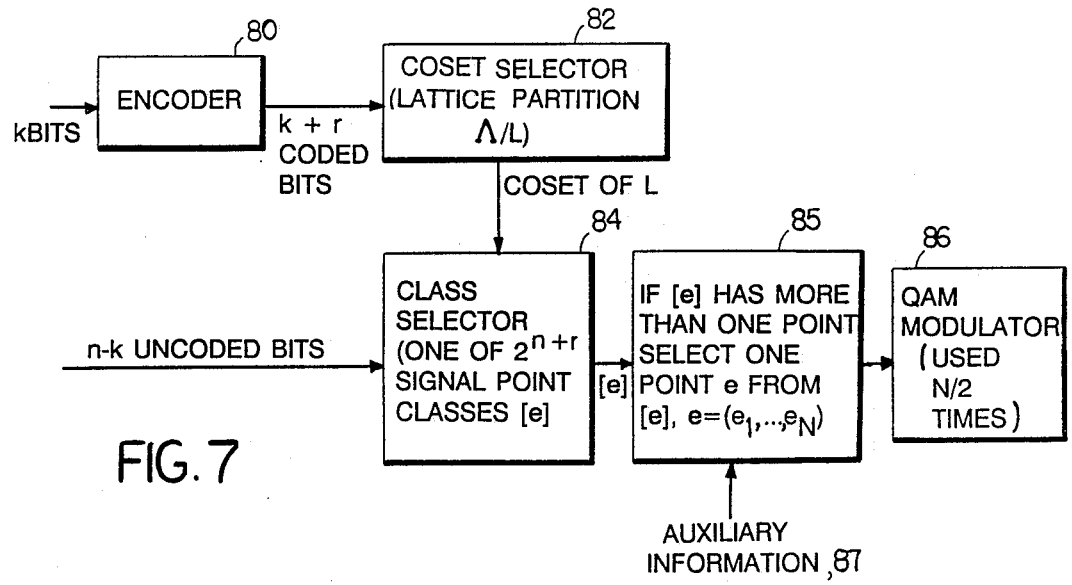
FIG. 7 is a block diagram illustrating a generalized coset code.

Referring to FIG. 7, in circuitry for implementing a generalized coset code, an encoder 80 takes in k bits per N-dimensional symbol and puts out k+r coded bits, which select a subset (one of the $2^{k+r}$ cosets of L whose union is the coset $\Lambda+c$ of $\Lambda$) in a coset selector 82 based on the lattice partition $\Lambda/L$. An additional n-k uncoded bits per N-dimensional symbol then selects (in a point selector 84) a particular signal point e or signal point equivalence class [e] from that subset. If the class [e] contains more than one point, an auxiliary selector 85 selects one signal point e from [e] based on auxiliary information 87; e.g., random data or secondary channel data. The N-dimensional signal point e is determined by N coordinates ($e_1, e_2, \ldots e_N$), which may be transmitted by N/2 uses of a QAM modulator 86 (assuming that N is even). Such a coset code transmits n bits per N-dimensional signal point, and in addition may transmit additional auxiliary information 87 whenever the size |e| of the class [e] is more than one.

Figure 8:
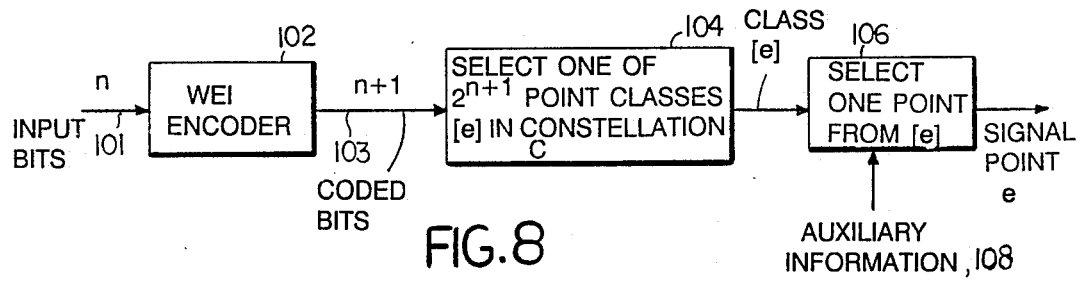
FIG. 8 is a block diagram of a coset code.

Referring to FIG. 8, more specifically the four-dimensional coset codes of Wei have the following general characteristics. To send an even integer number n of bits per four-dimensional data symbol, n input data bits (101) at a time are grouped for encoding. An encoder (102) (which may perform a number of operations, such as rate - ⅔ convolutional encoding (r=1), differential encoding, and/or scrambling) generates n+1 encoded bits 103, which must select one of $2^{n+1}$ signal points or signal point equivalence classes [e] from a signal constellation C whose points are drawn from a coset of the 4-dimensional integer lattice $Z^4$. If selector 104 selects a class [e] with more than one point, selector 106 selects one point from that class based on auxiliary information 108. Note that encoder 102 of FIG. 8 corresponds to encoder 80 of FIG. 7, if one views the n-k uncoded bits as also passing through encoder 80. Selectors 104 and 106 correspond to selectors 82, 84, and 85 of FIG. 7.

As an example, a Wei-type coset code for sending 8 bits per 4 dimensions in which $\Lambda=Z^4$ (N=4), e=(½, ½, ½, ½), L=$RD_4$, k=2, k+r=3 (r=1), and n=8 can be implemented using the Voronoi constellation C with ties based on the 512-way partition $Z_4/4D_4$ as follows. The constellation consists of points from $Z^4+$(½, ½, ½, ½), and divides evenly into $|Z_4/RD_4|=2^{k+r}=2^3=8$ subsets, each consisting of points drawn from a distinct coset of $RD_4$.

The eight cosets from which the eight subsets are drawn are defined respectively as the points in $RD_4+$(½, ½, ½, ½) summed with one of the following coset representatives:

(0, 0, 0, 0)
(1, 0, 0, 0)
(0, 1, 0, 0)
(1, 1, 0, 0)
(0, 0, 1, 0)
(0, 1, 0, 0)
(0, 1, 1, 0)
(1, 1, 1, 0)

Note that the coset representatives are all eight four-tuples in which the first three coordinates are either 1 or 0 and the last coordinate is 0 (which corresponds to the following fundamental region of $RD_4$: }r: $0 \le r_1 < 2$, $0 \le r_2 < 2$, $0 \le r_3 < 2$, $0 \le r_4 < 1$}).

Figure 9:
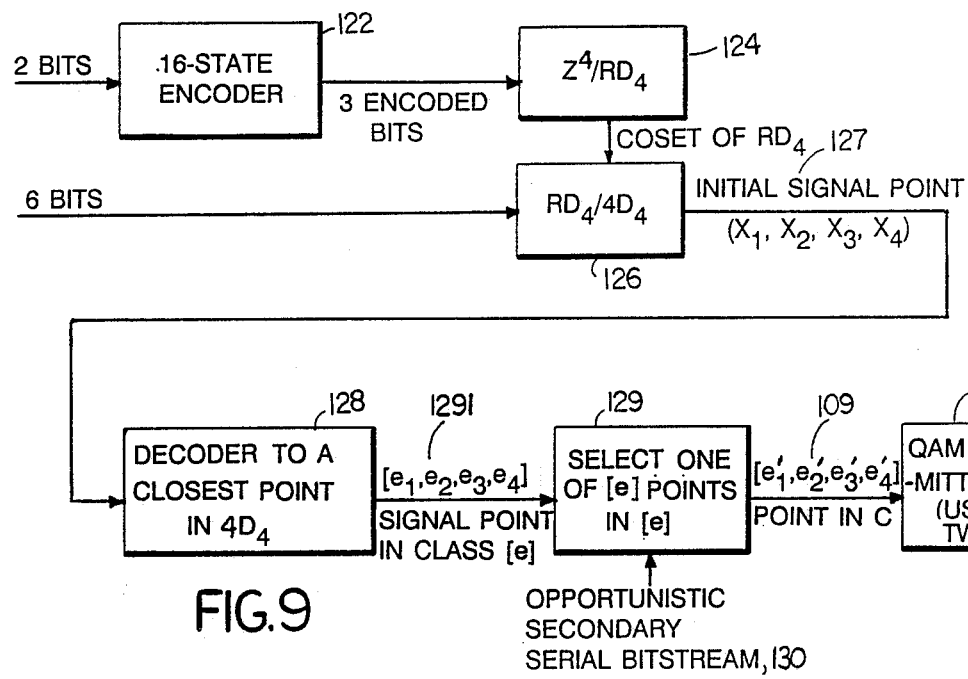
FIG. 9 is a block diagram illustrating a Wei-type coset code.

Referring to FIG. 9, two of the original eight bits are encoded as three bits (in 16-state encoder 122) and are used (in selector 124) to select one of the eight cosets of $RD_4$ whose union is $Z^4+c$. The other six bits select (in selector 126) one of 64 signal point classes in the chosen coset, where each of the 64 classes corresponds to one of the 64 cosets of $4D_4$ in the 64-way partition $|RD_4/4D_4$. Specifically, initial point x consists of a first coordinate $x_1$, which is one of the 8 half-integers in the range $0 \le j < 8$, i.e., $x_1 \in \{½, 3/2, \ldots, 15/2\}$; and three additional 4-valued coordinates $x_2, x_3, x_4 \in \{½, 3/2, 5/2, 7/2\}$. Each of the $8 \times 4 \times 4 \times 4 = 512$ such initial points $x=(x_1, x_2, x_3, x_4)$ is in a different equivalence class modulo $4D_4$. The four coordinates of the data word delivered by selector 126 may be expressed in a standard binary representation as follows:

| $x_{13}x_{12}x_{11} \cdot 1$; | $x_{22}x_{21} \cdot 1$; | $x_{32}x_{31} \cdot 1$; | and $x_{42}x_{41} \cdot 1$ |
|---|---|---|---|
| | $x_{13}$ | | |
| $x_{12}$ | $x_{22}$ | $x_{32}$ | $x_{42}$ |
| $x_{11}$ | $x_{21}$ | $x_{31}$ | $x_{41}$ | e.g., $x_1=4x_{13}+2x_{12}+x_{11}+½$. Selector 124 uses the three coded bits to specify bits $x_{11}, x_{21}, x_{31}$ so that the cosets of $RD_4$ are specified in accordance with the Wei code, as we shall discuss in more detail below. Selector 126 uses the six uncoded bits to specify the remaining coordinates $x_{13}, x_{12}, x_{22}, x_{32}, x_{42}$, and $x_{41}$.

Referring again to FIG. 9, initial point x is decoded (in decoder 128) to the nearest point in $4D_4$ using a mimimum-distance decoder. The resulting apparent error vector e (1291) is (one of the) point(s) of the equivalence class [e] of points equivalent to the initial word x that lie in C. Point selector 129 then selects one of the $|e|$ points in [e] based on auxiliary information, which may be a stream 130 of opportunistic secondary channel data. Finally, the selected point $e' = (e_1', e_2', e_3', e_4')$ 109 is sent by a QAM transmitter 110 used twice.

Similarly, it is necessary at the receiver to find the initial signal point corresponding to a given decoded Voronoi constellation point. To do this, find the residues of the four coordinates modulo 4. This determines the last three coordinates; the first coordinate is either the residue so determined or that residue plus 4, whichever is in the same equivalence class as the decoded point modulo $4D_4$. This can be determined by subtracting the residues from the decoded point and determining whether the difference (whose coordinates are all multiples of 4) contains an even or odd number of multiples of 4; addition of 4 to the first coordinate is necessary in the latter case.

The above description indicates in general how a Voronoi constellation with ties may be used with a Wei-type coset code. We now outline the approach for converting the particular embodiment described in the Wei patent for use with this Voronoi constellation.

Wei's particular embodiment includes a differential encoding feature. To implement differential encoding, the constellation C has been chosen from the coset of $Z_4$ consisting of the 4-tuples of half-integers, i.e., $Z^4 + (\frac{1}{2}, \frac{1}{2}, \frac{1}{2}, \frac{1}{2})$. The encoder now takes 3 bits in per 4-dimensional signal point, called $I1_n$, $I2_n$, $I3_n$ (as in FIG. 7 of Wei). A differential encoder converts $I2_n$, $I3_n$, to $I2_n'$, $I3_n'$. A 16-state rate $\frac{2}{3}$ convolutional encoder generates a parity bit $Y0_n$. The four bits $Y0_n$ $I1_n$, $I2_n'$, $I3_n'$ are converted to four bits $Z0_n$, $Z1_n$, $Z0_n+1$, $Z1_n+1$ in a bit converter. The four coordinates $x_1$, $x_2$, $x_3$, $x_4$ are then expressed as above in standard binary representation as $x_1 = x_{13}x_{12}x_{11}.1$
$x_2 = x_{22} x_{21}.1$
$x_3 = x_{32} x_{31}.1$
$x_4 = x_{42} x_{41}.1$ where the ".1" indicates the binary fraction $\frac{1}{2}$. The mapping rules are

| $Z0_nZ1_n$ | $x_{11}x_{21}$ | $Z0_{n+1}Z1_{n+1}$ | $x_{31}x_{41}$ |
|---|---|---|---|
| 00 | 00 | 00 | 00 |
| 01 | 11 | 01 | 11 |
| 10 | 10 | 10 | 10 |
| 11 | 01 | 11 | 01 | which can be expressed by the binary (modulo 2) equations $x_{21} = Z1_n$, $x_{11} = Z0_n + Z1_n$, etc. The remaining five bits $x_{13}$, $x_{12}$, $x_{22}$, $x_{32}$, and $x_{42}$ are specified by 5 uncoded bits. (This is to send $n = 8$ bits per 4-dimensional symbol.)

To send $n = 14$ bits per 4D symbol, as in Wei's FIG. 7, the data word coordinates are represented as $x_1 = x_{14}x_{13}x_{12}x_{11}.1$
$x_2 = x_{24}x_{23}x_{22}x_{21}.1$
$x_3 = x_{34}x_{33}x_{32}x_{31}.1$
$x_4 = x_{43}x_{42}x_{41}.1$, $x_{11}$, $x_{21}$, $x_{31}$, and $x_{41}$ are specified as above (using 3 input bits $I1_n$, $I2_n$, $I3_n$), and the remaining 11 bits $x_{14}$, $x_{13}$, $x_{12}$, $x_{24}$, $x_{23}$, $x_{22}$, $x_{34}$, $x_{33}$, $x_{32}$, $x_{43}$, $x_{42}$ are specified by the remaining bits $I1-7_{n+1}$, $I4-7_n$.

GENERAL COSET CODES BASED ON BINARY LATTICES

We now consider an alternative general form for coset codes based on binary lattices using Voronoi constellations.

If $\Lambda$ and L are binary lattices, then $Z^N/\Lambda/L/R^\mu Z^N$ is a lattice partition chain, where the minimum such $\mu$ is defined as the depth of the partition $\Lambda/L$. Any code based on a partition $\Lambda/L$ of binary lattices $\Lambda$ and L can then be put into the form shown in the upper part of FIG. 10, with a binary encoder E' 300 that has $k + k(L)$ input bits and $\mu N/2 = k(L) + (k + r) + r(\Lambda)$ output bits, where k(L) is the informativity of L (defined by $|L/R^\mu Z| = 2^{k(L)}$) and $r(\Lambda)$ is the redundancy of $\Lambda$ (defined by $|Z/\Lambda| = 2^{r(\Lambda)}$). The $\mu N/2$ output bits of encoder E' 300 are used to select one of the $2^{\mu N/2} = |Z^N/E^\mu Z^N|$ cosets of $R^\mu Z^N$ in $Z^N$ in coset selector 302.

We may use a Voronoi constellation based on a partition $\Lambda/\Lambda'$ with such a code, as long as $\Lambda'$ is a sublattice of L. Then the cosets of L in $\Lambda$ each comprise the same number of cosets of $\Lambda'$.

Let the lattice $\Lambda'$ be a binary lattice and a sublattice of $R^{m+\mu}Z^N$, and let $r(\Lambda')$ be the redundancy of $\Lambda'$; i.e., $|R^{m+\mu}Z^N/\Lambda'| = 2^{r(\Lambda')}$. Then coset selector 84 of FIG. 7 can be partitioned into the two parts shown in FIG. 10: a coset selector 304 in which $mN/2$ uncoded bits select one of $2^{mN/2}$ cosets of $R^{m+\mu}Z^N$ in the selected coset of $R^\mu Z^N$, and a coset selector 306 in which $r(\Lambda')$ uncoded bits select one of $2^{r(\Lambda')}$ cosets of $\Lambda'$ in the selected coset of $R^{m+\mu}Z^N$.

The mapping of $(m+\mu)N/2$ bits to one of the $2^{(m+\mu)N/2}$ cosets of $R^{m+\mu}Z^N$ in $Z^N$ in the top two sections 302, 304 is basically a matter of independently selecting $N/2$ points from a two-dimensional $2^{m+\mu}$-point constellation (apart from assuring that the selection of the cosets is done in accordance with the code, including any provision for differential coding), and is therefore trivial to implement.

Scaling is also trivial; if we wish to send an additional bit per two dimensions, we simply apply the binary rotation operator R defined above to $R^{m+\mu}Z^N$ and to $\Lambda'$. The Voronoi region of $R\Lambda'$ is a version of the Voronoi region of $\Lambda'$ that is scaled by $2^{\frac{1}{2}}$, and contains $2^{N/2}$ times as many points of $\Lambda$. Therefore we can simply add $N/2$ uncoded bits to the middle group of $mN/2$ in FIG 10. Note also that the shape of the constellation is not affected by such a transformation.

Notice that the coding and the shaping are effectively completely decoupled. The coding takes place in the top section 300, 302 (and affects the 'least significant bits'); the shaping takes place wholly in the bottom section 306 (and has to do with the 'most significant bits'). The shaping complexity and shape gain are wholly a function of what is done in the bottom section 306, just as the coding complexity and (fundamental) coding gain are wholly a function of what is done in the top section 300, 302.

Figure 10:
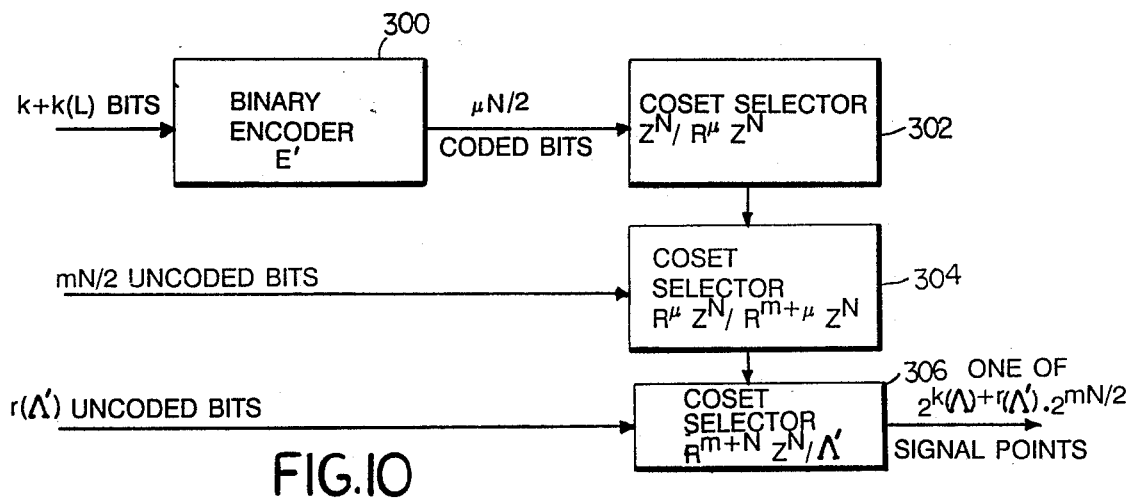
FIG. 10 is a block diagram of a coset code for a binary lattice.
Figure 11:
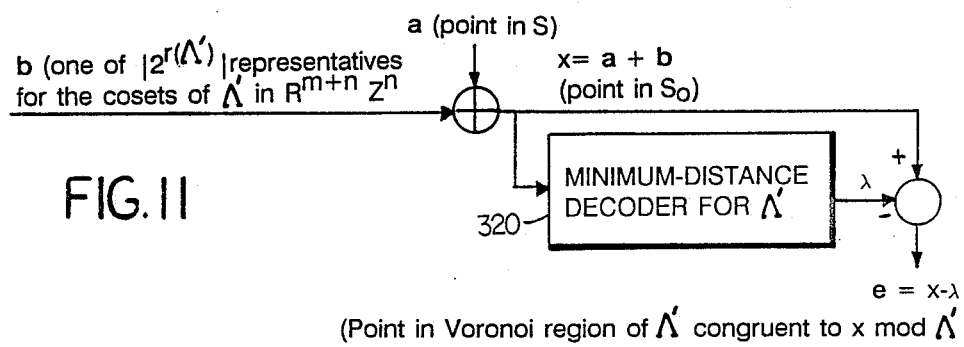
FIG. 11 is a block diagram of a mapper.

In general, the bottom section 306 can be realized in the following straightforward manner, illustrated in FIG. 11. Let S be the Voronoi region of $R^{m+\mu}Z^N$ - i.e., an N-cube of side $2^{(m+\mu)}$. The union of regions $S + b$ as b ranges through a set of $|R^{m+\mu}Z^N/\Lambda'| = 2^{r(\zeta')}$ coset representatives for the cosets of $\Lambda'$ in $R^{m+\mu}Z^N$ is a simple fundamental region $S_0$ for $\Lambda'$. Let a then be a point in S selected by the upper sections 300, 302, 304 (FIG. 10). For the bottom section 306 (FIG. 10), we map the inputs (e.g., r(Λ') uncoded bits) into one of $2^{r(\Lambda')}$ coset representatives b and then form initial signal point x as the sum x=a+b, which is a point in $S_0$. Then we may use a minimum-distance decoder 320 for Λ' to decode to a point λ in Λ; the resulting error vector e=x−λ is in the Voronoi region of Λ', and is congruent to x=a+b modulo Λ'. (If there is more than one nearest point e, then a further selection as in selectors 85, 106, or 129 is made.)

Assuming that the complexity of the map from inputs to b is negligible (as it is in the 4-dimensional mappings discussed above), the complexity of the mapping of FIG. 11 is essentially the complexity of the minimum-distance decoder for Λ', which is discussed in the previously cited references.

This mapping has other nice properties. For instance, since e is congruent to x=a+b modulo Λ', and Λ' is a sublattice of $R^{m+\mu}Z^N$, it follows that e is congruent to a modulo $R^{m+\mu}Z^N$ (since b is an element of $R^{m+\mu}Z^N$). Thus the input a and the output e of this map are congruent modulo $R^{m+\mu}Z^N$.

Also, the map is easily invertible. Given e, we can determine a and b as follows. To find a, decode e with a minimum-distance decoder for $R^{m+\mu}Z^N$; this is just a matter of finding the closest element in $R^{m+\mu}Z^N$ for each 2-tuple. The error in this decoding is the unique element in S that is congruent to e modulo $R^{m+\mu}Z^N$, and must therefore be a. To find x=a+b, decode e with a fair, exhaustive decoder for Λ' whose common error region is $S_0$; the error in this decoding is the unique element in $S_0$ that is congruent to e modulo Λ', and must therefore be x. Generally, S and $S_0$ will be simple error regions with simple associated decoders (as in the 4D examples above). Thus the complexity in constellation mapping, or in quantizing, lies in the transmitter, not the receiver.

VORONOI CONSTELLATIONS BASED ON DEPTH-2 BINARY LATTICES

It is possible to reduce implementation complexity and achieve other advantages by basing Voronoi constellations on the Voronoi regions of certain classes of mod-2 binary lattices $\Lambda' = \Lambda_{(N,K)}$ based on (N,K) binary block codes. The lattice $\Lambda_{(N,K)}$ is defined as the set of all integer N-tuples that are congruent to any of the codewords in a given (N,K) binary block code, mod 2.

The depth of an N-dimensional binary lattice Λ is defined as the least μ such that $R^\mu Z^N$ is a sublattice of Λ, where R is the two-dimensional rotation operator applied to each 2-tuple of the points of Λ. That is, $Z^N/\Lambda/R^\mu Z^N = (R^\mu Z^2)^{N/2}$ is a lattice partition chain. A mod-2 lattice has $2Z^N = R^2 Z^N$ as a sublattice, and therefore has a depth 1 or 2.

For binary lattices, the redundancy r(Λ) and informativity k(Λ) of Λ are defined so that the orders (indexes) $|Z/\Lambda|$ and $|\Lambda/R^\mu Z^N|$ are $2^{r(\Lambda)}$ and $2^{k(\Lambda)}$, respectively. Since $|Z^N/R^\mu Z^N| = 2^{\mu N/2}$, it follows that r(Λ)+k(Λ)=μN/2. The normalized redundancy ρ(Λ) and normalized informativity κ(Λ) of Λ are defined as ρ(Λ)=2r(Λ)/N and κ(Λ)=2k(Λ)/N, respectively, so that ρ(Λ)+κ(Λ)=μ.

Particularly useful are mod-2 binary lattices having normalized informativity values less than 1, e.g., $\frac{1}{2}$, or $\frac{1}{4}$.

Figure 12:
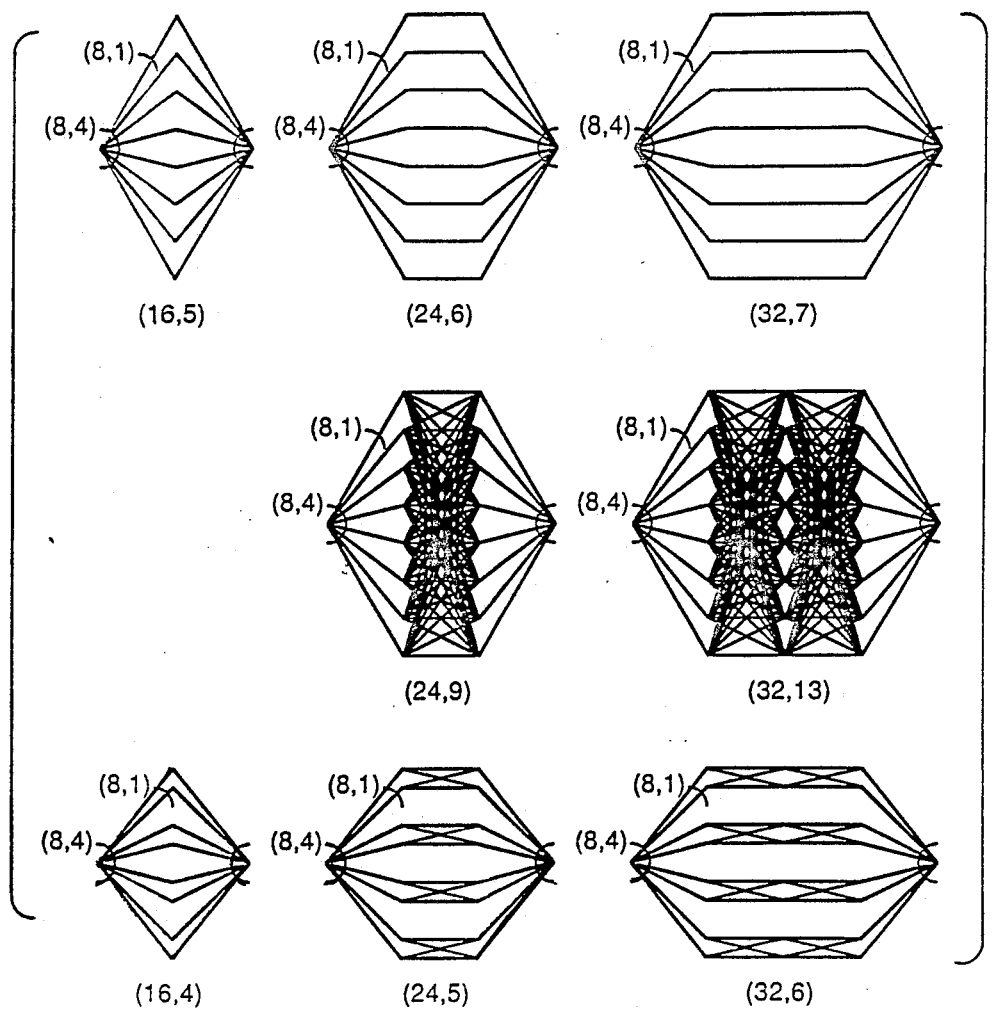
FIG. 12 shows trellises for use with certain mod-2 lattices based on (N,K) block codes.

For example, in 16 dimensions, the depth-2 lattice $H_{16}^* = \Lambda_{(16,5)}$, where (16,5) is a first-order Reed-Muller code, is a 'dual principal sublattice' of the Barnes-Wall lattice $\Lambda_{16}$. ($\Lambda_{16}$ is actually a sublattice of $H_{16}^*$, of order 2; it is $RH_{16}^*$ that is a sublattice of $\Lambda_{16}$, of order $2^7$.) It may be constructed by a 'squaring construction' $H_{16}^* = |E_8/RD_8^*|^2$, where $E_8/RD_8^*$ is the 8-way partition of the mod-2 Gosset lattice $E_8 = \Lambda_{(8,4)}$ into 8 cosets of the mod-2 lattice $RD_8^* = \Lambda_{(8,1)}$, just as the (16,5) code can be constructed by a squaring construction using the 8-way code partition (8,4)/(8,1). (The construction of the code—squaring, or as mentioned below, cubing—may be defined by the trellis diagram for the code, as illustrated in FIG. 12.) There is a corresponding 8-state trellis diagram for either the (16,5) code or for $H_{16}^* = \Lambda_{(16,5)}$, labelled '(16,5)' in FIG. 12.

In 24 dimensions, the depth-2 lattice $X_{24}^* = \Lambda_{(24,6)}$ may be constructed by a 'cubing construction' $X_{24}^* = |E_8/RD_8^*/RDd_8^*|^3$, using the same 8-way partition $E_8/RD_8^*$; the corresponding (24,6) code has the cubing construction $|(8,4)/(8,1)/(8,1)|^3$. There is a corresponding 8-state trellis diagram, labelled '(24,6)' in FIG. 12. $X_{24}^*$ has a nice normalized informativity of $\kappa(X_{24}^*) = \frac{1}{2}$ which makes it suitable for use with a code such as the 4D Wei code (see below).

In 32 dimensions, the depth-2 lattice $X_{32}^* = \Lambda_{(32,6)}$ may be constructed by an iterated squaring construction $X_{32}^* = |E_8/RD_8^*/2Z^8|^4$, using the 16-way partition chain $E_8/RD_8^*/2Z^8$; the corresponding (32,6) code is a first-order Reed Muller code with the construction $|(8,4)/(8,1)/(8,0)|^4$. There is a corresponding 16-state trellis diagram, labelled '(32,6)' in FIG. 12.

Table 2 (below) and FIG. 12 give the constructions, parameters, and trellis diagrams of eight codes and corresponding mod-2 lattices in 16, 24, and 32 dimensions that may be constructed either from the 8-way partition (8,4)/(8,1) or the 16-way partition chain (8,4)/(8,1)/(8,0), which determines the number s of states (8 or 16) in the associated trellis diagram. The normalized informativity $\kappa(\Lambda_{(N,K)}) = 2K/N$ determines the so-called constellation expansion ratio $CER_s(\Lambda) = 2^{\kappa(\Lambda)}$. (The constellation expansion ratio is asymptotically the increase in size of the constituent 2D constellation $C_2$ compared to its minimum possible size.) The shape gain $Y_s(\Lambda)$ represents the gain associated with the Voronoi region of Λ, defined as the ratio between the average power of a cube of volume V(Λ) and the average power of the Voronoi region of Λ, normalized for minimum distance. From these two quantities we can determine the peak-to-average ratio as $PAR(\Lambda) = 3 \cdot CER_s(\Lambda) \cdot Y_s(\Lambda)$.

TABLE 2

| | | Shape gains and constellation expansion ratios of mod-2 lattices $\Lambda_{(N,K)}$ | | | | | |
|---|---|---|---|---|---|---|---|
| N | K | construction | s | κ | $CER_s$ | $\gamma_s$ (dB) | PAR |
| 16 | 5 | $|(8,4)/(8,1)|^2$ | 8 | $\frac{5}{8}$ | 1.542 | 1.206 0.81 | 5.58 |
| 16 | 4 | $|(8,4)/(8,0)|^2$ | 16 | $\frac{1}{2}$ | 1.414 | 1.167 0.67 | 4.95 |
| 24 | 6 | $|(8,4)/(8,1)/(8,1)|^3$ | 8 | $\frac{1}{2}$ | 1.414 | 1.215 0.84 | 5.16 |
| 24 | 9 | $|(8,4)/(8,4)/(8,1)|^3$ | 8 | $\frac{3}{4}$ | 1.682 | 1.183 0.73 | 5.97 |
| 24 | 5 | $|(8,4)/(8,1)/(8,0)|^3$ | 16 | 5/12 | 1.335 | 1.192 0.76 | 4.77 |
| 32 | 7 | $|(8,4)/(8,1)/(8,1)|^4$ | 8 | 7/16 | 1.354 | 1.217 0.85 | 4.94 |
| 32 | 13 | $|(8,4)/(8,4)/(8,1)|^4$ | 8 | 13/16 | 1.756 | 1.176 0.70 | 6.19 |

TABLE 2-continued

| | | Shape gains and constellation expansion ratios of mod-2 lattices $\Lambda_{(N,K)}$ | | | | | | |
|---|---|---|---|---|---|---|---|---|
| N | K | construction | s | κ | $CER_s$ | $\gamma_s$ | (dB) | PAR |
| 32 | 6 | $\|(8,4)/(8,1)/(8,0)\|^4$ | 16 | ⅜ | 1.297 | 1.200 | 0.79 | 4.67 |

These lattices achieve good shape gains, not much inferior to the shape gains of the Barnes-Wall lattice $\Lambda_{16}$ (0.86 dB) or the Leech lattice $\Lambda_{24}$ (1.03 dB). Indeed, the shape gains of $X_{24}^*$ and $\Lambda_{(32,7)}$ are about the same as that of the Barnes-Wall lattice $\Lambda_{16}$, but they have constellation expansion ratios of about 1.4 and a peak-to-average ratios of about 5, which are much more reasonable than the values for the Barnes-Wall lattice (2.828 and 10.35, respectively). The increase in dimension from 16 to 24 does not seem a very great penalty. In fact, these results suggest that increasing dimension is the easiest way to improve shape gain.

The best shape gains of depth-2 lattices in all dimensions are obtained by constructions based on the 8-way lattice partition $E_8/RD_8^*$, with 'repetition type' constructions (first row of FIG. 12) being superior to 'fully-connected' constructions (second row of FIG. 12).

These lattices are also considerably easier to decode than the optimal lattices. For example, the Barnes-Wall lattice $\Lambda_{16}$ has a 16-state trellis diagram, and a decoding algorithm that requires about 511 operations per 16 dimensions; the Leech lattice has a 256-state trellis diagram, and a decoding algorithm that requires more than 10,000 decoding operations per 24 dimensions (Forney U.S. patent application Ser. No. 828,397, cited above). In contrast, the $\Lambda_{(24,6)}$ or $\Lambda_{(32,7)}$ lattices have the simple 8-state trellis diagrams shown in FIG. 12 and can be decoded with only 95 operations per 24 dimensions or 127 operations per 32 dimensions, as follows (analogously to the methods shown in Forney, U.S. patent application, Ser. No. 828,397).

(a) For each of the 24 or 32 coordinates, given the coordinates $r_k$ of a received word r, determine the closest even integer and odd integer to $r_k$. If $e_k$ is the distance to the closest even integer, then $1-e_k$ is the distance to the closest odd integer. Let the coordinate metric be $m_k = 1-2e_k$; thus $m_k = 1$ if $e_k = 0$ and $m_k = 1$ if $e_k = 1$.

(b) For each coordinate 8-tuple, perform an 8-dimensional Fast Hadamard Transform of the metric 8-tuple m; then take the absolute values of the 8 transform values as the metrics of the 8 cosets of $RD_8^*$ in $E_8$. This takes 24 additions/subtractions of two numbers per 8-tuple, plus 8 absolute values.

(c) Since the construction is a simple repetition construction, for each of the 8 cosets of $RD_8^*$ in $E_8$, we need merely sum the 3 or 4 corresponding constituent 8-tuple metrics, and then do an 8-way comparison to find the best. (This is the Viterbi algorithm applied to the 8-state trellis labelled '(24, 6)' or '(32,7)' in FIG. 12.) This takes 16 additions for 24-tuple or 24 additions per 32-tuple, plus 7 comparisons of two numbers.

Thus the decoding complexity is only about 8 operations per two dimensions, which is almost trivial, particularly when measured against about 0.85 dB of shape gain. This makes these lattices attractive for use in lattice quantizers, as well.

It is not necessary that the dimension of the Voronoi constellation be equal to the dimension of the lattices used in the code. For example, a sequence of six 4-dimensional symbols from the Wei code (represented by 6n+6 coded bits) can be mapped into a signal point of a 24-dimensional Voronoi constellation based on a lattice partition $Z^{24}/\Lambda'$, where $\Lambda'$ is a 24-dimensional lattice of the type of the $X_{24}^*$ lattice. For example, for n=8, there are Voronoi constellations based on the $2^{54}$-way lattice partition $Z^{24}/2RX_{24}^*$ which can be used with the Wei code. To map from bits to points, first create a 24-dimensional initial signal point x in $Z^{24}+(\frac{1}{2})^{24}$ with six coordinates taking on one of 8 values in $Z+\frac{1}{2}$, and 18 coordinates taking on one of 4 values in $Z+\frac{1}{2}$, such that the resulting $2^{54}=8^6 \times 4^{18}$ signal points each fall in a distinct equivalence class of $2RX_{24}^*$. Then decode to the closest point in $2RX_{24}^*$ above. If there is more than one equally close point, choose one point e from the equivalence class using auxiliary information. Transmit the resulting apparent error vector e as 12 successive QAM symbols. Such a 24-dimensional constellation can gain of the order of 0.5 dB over a 4-dimensional constellation, with quite reasonable complexity.

TERNARY AND QUATERNARY LATTICES

We have seen examples of Voronoi constellations based on multi-dimensional binary lattices. More generally, Voronoi constellations based on ternary or quaternary lattice partitions of modest depth and informativity may be expected to have advantages similar to those of binary lattices with respect to shape gain versus constellation expansion ratio.

A ternary lattice $\Lambda$ is an N-dimensional lattice whose constituent 2D lattice (the projection of $\Lambda$ onto any two dimensions) is $A_2$ and whose constituent 2D sublattice (the projection of the sublattice of $\Lambda$ consisting of all points in $\Lambda$ whose coordinate values are all-zero except in two dimensions onto those dimensions) is $R'^\mu A_2$, where $R'$ is the two-dimensional ternary rotation operator defined by the $2 \times 2$ matrix $R' = \{(0,\sqrt{3})(-\sqrt{3},0)\}$ corresponding to a rotation by 90° and scaling by a factor of $3^{\frac{1}{2}}$. That is, $A_2^{N/2}/\Lambda/R'^\mu A_2^{N/2} = (R'^\mu A_2)^{N/2}$ is a lattice partition chain. The parameter $\mu$ is called the (ternary) depth of $\Lambda$. For ternary lattices, the redundancy $r(\Lambda)$ and informativity $k(\Lambda)$ of $\Lambda$ are defined so that the orders (indexes) $|A_2^{N/2}/\Lambda|$ and $|\Lambda/R'^\mu A_2^{N/2}|$ are $3^{r(\Lambda)}$ and $3^{k(\Lambda)}$, respectively. Since $|A_2^{N/2}/R'^\mu A_2^{N/2}| = 3^{\mu N/2}$, it follows that $r(\Lambda)+k(\Lambda)=\mu N/2$. The normalized redundancy $\rho(\Lambda)$ and normalized informativity $\kappa(\Lambda)$ of $\Lambda$ are defined as $\rho(\Lambda)=2r(\Lambda)/N$ and $\kappa(\Lambda)=2k(\Lambda)/N$, respectively, so that $\rho(\Lambda)+\kappa(\Lambda)=\mu$.

A quaternary lattice $\Lambda$ is an N-dimensional lattice whose constituent 2D lattice is $A_2$ and whose constituent 2D sublattice is $2^\mu A_2$. That is, $A_2^{N/2}/\Lambda/2^\mu A_2^{N/2}$ is a lattice partition chain. The parameter $\mu$ is again called the depth of $\Lambda$ (as a quaternary lattice). For quaternary lattices, the redundancy $r(\Lambda)$ and informativity $k(\Lambda)$ of $\Lambda$ are defined so that the order (indexes) $|A_2^{N/2}/\Lambda|$ and $|\Lambda/2^\mu A_2^{N/2}|$ are $4^{r(\Lambda)}$ and $4^{k(\Lambda)}$, respectively. Since $|A_2^{N/2}/2^\mu A_2^{N/2}| = 4^{\mu N/2}$, it follows that $r(\Lambda)+k(\Lambda)=\mu N/2$. The normalized redundancy $\rho(\Lambda)$ and normalized informativity $\kappa(\Lambda)$ of $\Lambda$ are defined as $\rho(\Lambda)=2r(\Lambda)/N$ and $\kappa(\Lambda)=2k(\Lambda)/N$, respectively, so that $\rho(\Lambda)+\mu(\Lambda)=\mu$.

Figure 13:
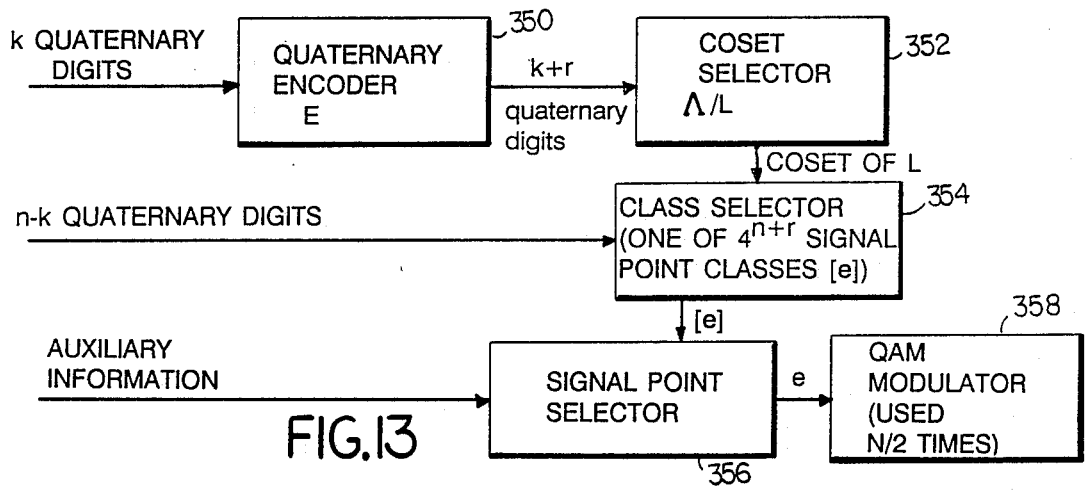
FIGS. 13 and 14 are block diagrams of trellis codes based on quaternary lattices.
Figure 14:
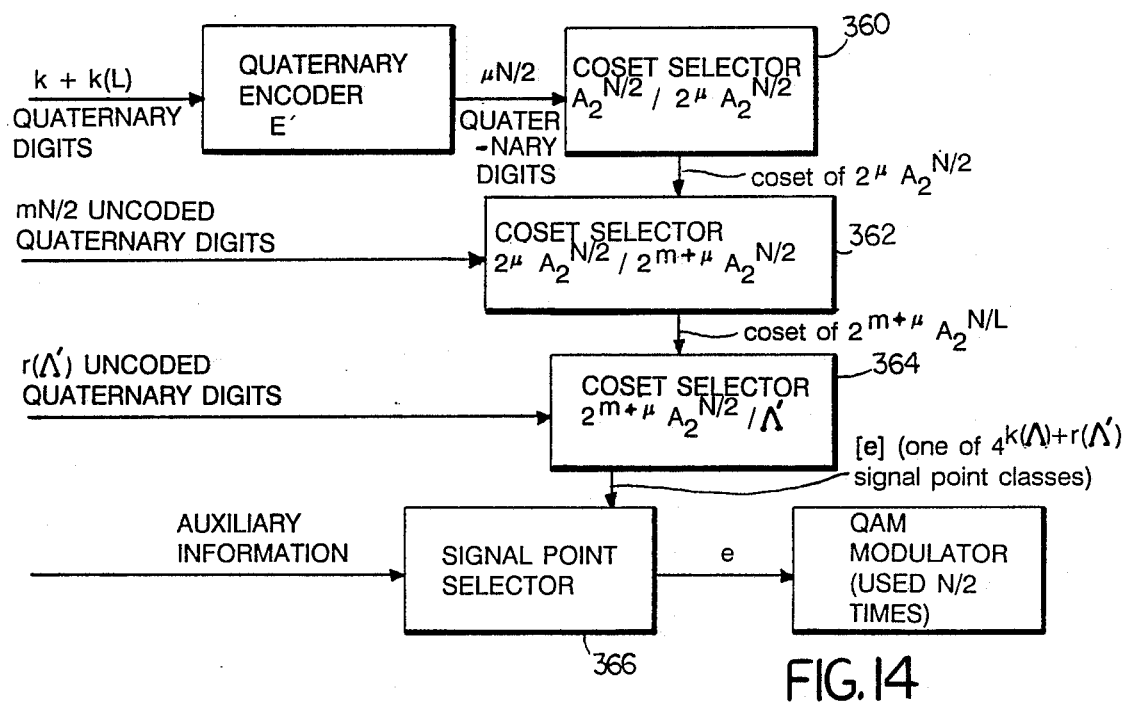

FIGS. 13 and 14 show how FIGS. 7 and 10 are to be modified for the quaternary case, for example. (For the ternary case, substitute 'ternary' for 'quaternary', '3' for '4', 'R'$^\mu$A$_2$', and for '2$^\mu$A$_2$', and 'R'$^{m+\mu}$A$_2$' for '2$^{m+\mu}$A$_2$'.) FIG. 13 shows a trellis code based on a partition $\Lambda/L$ of N-dimensional quaternary lattices, with the order $|\Lambda/L|$ of the partition being $4^{k+r}$. A rate-k/(k+r) quaternary encoder E 350 takes in k quaternary digits per N-dimensions, and puts out k+r quaternary digits, which select (in coset selector 352) one of the $2^{k+r}$ cosets of L whose union is the selected coset $\Lambda+c$ of $\Lambda$. (A quaternary digit can be represented as two binary digits, and the quaternary decoder E could in fact be a rate-2k/(2k+2r) binary encoder; an example of such a code based on the 4-way partition A$_2$/2A$_2$ and a rate-$\frac{1}{2}$ binary encoder is shown in Calderbank and Sloane, IEEE Trans. on Inf. Theory, Jan., 1987.) Thus, to send a total of n quaternary digits per N dimensions, the remaining n-k uncoded quaternary digits select (in selector 354) one of $4^{n-k}$ signal points e or signal point classes [e], in a constellation with ties; in the latter case, auxiliary information selects (in selector 356) one point e from the class [e]. The N-dimensional signal point e is transmitted by N/2 uses of a 2-dimensional QAM modulator 358. The total number of signal points, or signal point classes, is thus $4^{n+r}$, all from $\Lambda+c$.

In FIG. 14, the encoder E is augmented by adding k(L) quaternary input digits (where k(L) is the informativity of the lattice L, so that $|L/2^\mu A_2^{N/2}|=4^{k(L)})$ and k(L)+r($\Lambda$) quaternary output digits (where r($\Lambda$) is the redundancy of the lattice $\Lambda$, so that $|A_2^{N/2}/\Lambda|=4^{r(\Lambda)}$), for a total of $\mu N/2$ output digits, which select (in selector 360) one of the $4^{\mu N/2}$ cosets of $2^\mu A_2^{N/2}$ whose union is $A_2^{N/2}+c$, and in fact includes r($\Lambda$) fixed bits so that the selected coset is always in $\Lambda+c$. A further mN/2 uncoded quaternary digits select (in selector 362) one of the $4^{mN/2}$ cosets of $2^{m+\mu}A_2^{N/2}$ whose union is the selected coset of $2^\mu A_2^{N/2}$, and a final r($\Lambda'$) uncoded quaternary digits select (in selector 364) a signal point e (or a signal point class [e]) from one of $4^{r(\Lambda')}$ signal points (or signal point classes) within the selected coset of $2^{\mu+m}A_2^{N/2}$. The constellation may be a Voronoi constellation based on the partition $\Lambda/\Lambda'$, in which case the selectors will select the one of the $4^{r(\Lambda')+mN/2+k(\Lambda)}$ points (or point classes) in $\Lambda+c$ that lie in the Voronoi region of $\Lambda'$. In the case of ties, further auxiliary information selects (in selector 366) a signal point e from the class [e], which is then transmitted in a QAM modulator as before.

Voronoi constellations based on ternary or quaternary lattices naturally have contituent 2D constellations that lie within a hexagon-shaped region, whereas those based on binary lattices lie within square regions. This generally leads to lower peak-to-average power ratios (PAR) for the constituent 2D constellations. In addition, a larger variety of codes and constellations is available, and some may have superior characteristics for certain applications.

QUANTIZER APPLICATIONS

The lattices $\Lambda'$ that are useful in Voronoi constellations may also be useful in quantizer applications. A lattice quantizer is simply a mimimum-distance decoder that maps an incoming N-tuple r into the closest lattice point $\lambda$ in $\Lambda'$, as discussed earlier. The quantization error e is $r-\lambda$, and the mean-squared quantization error is inversely proportional to the shape gain.

For quantizer applications, where constellation expansion may not be a consideration, a lattice quantizer based on $X_{24}^*$ or $\Lambda_{(32,7)}$ will still be generally preferred to one based on $\Lambda_{16}$, since it will yield effectively the same mean-squared quantization error (0.85 dB better than a scalar quantizer), with much more reasonable quantizer complexity.

Figure 15:
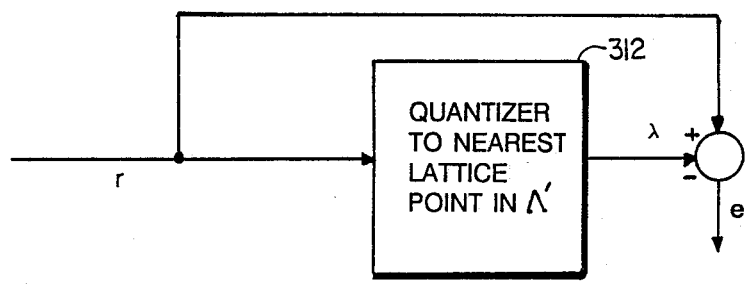
FIG. 15 is a block diagram of a quantizer.

Referring to FIG. 15, in a quantizer application, an incoming word r is quantized to the closest lattice point ($\lambda$) by a quantizer 312. The quantizer may also generate e, the quantization error, in the same manner as in the encoding process previously described.

MODEM CIRCUITRY

Figure 16:
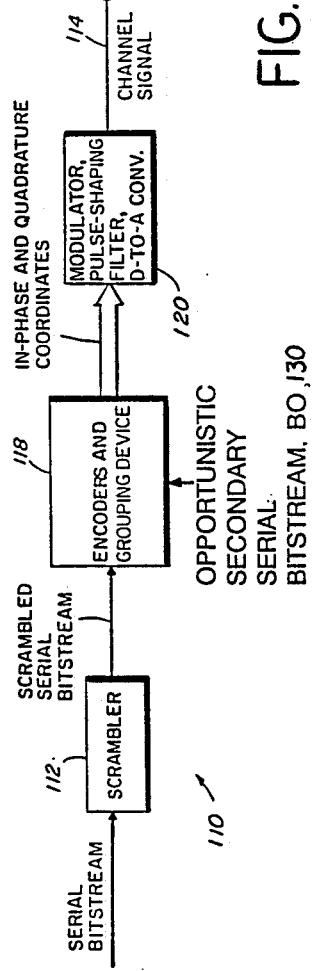
FIGS. 16 and 17 are block diagrams of a modem transmitter and receiver.

The Voronoi constellation may be used in modem circuitry for sending digital data over a noise-affected channel. Referring to FIG. 16, in modem transmitter 110 a scrambler 112 receives a serial bitstream of information to be sent over a channel 114. The scrambled information bits are then delivered to encoders and grouping device 118 at a rate of Q bits per signaling interval. Thus, the bits appearing at the input of encoders and grouping device 118 with respect to a given signaling interval (for example, the ith signaling interval) can be denoted $I1_i$ through $IQ_i$. Based on the information bits appearing with respect to a block of some number N/2 of successive signaling intervals (that is the information bits $I1_q$ through $IQ_q$, for q=i, i+1, . . . , i+N/2−1), the encoders and grouping device 118 deliver to modulator 120 N/2 pairs of in-phase and quadrature coordinates in series, one pair in each signaling interval, each pair corresponding to a point in a two-dimensional (2D) signal constellation. These pairs of coordinates are then used in modulator 120 to modulate a carrier. The modulated carrier is then pulse-shape filtered, and then D-to-A converted to an analog signal for transmission over channel 114, as in a conventional Quadrature-Amplitude-Modulated (QAM) carrier system.

For example, in FIG. 8, n/2 bits per signaling interval are grouped and encoded into a code vector ($e_1$, $e_2$, $e_3$, $e_4$) which is transmitted as two successive QAM symbols. Encoders and grouping device 118 are arranged, among other things, to map data words to the points of the Voronoi constellation and thus contain information from which the points of the Voronoi constellation can be generated. The mapping may be done in the manner previously described.

In the case of a Voronoi constellation with ties, the opportunistic secondary serial bitstream 130 is also delivered to encoders and grouping device 118, which chooses among boundary points based on the bits in bitstream 130. In the scheme of FIG. 9, bitstream 130 is delivered to selector 129 to choose among tied boundary points.

Figure 17:
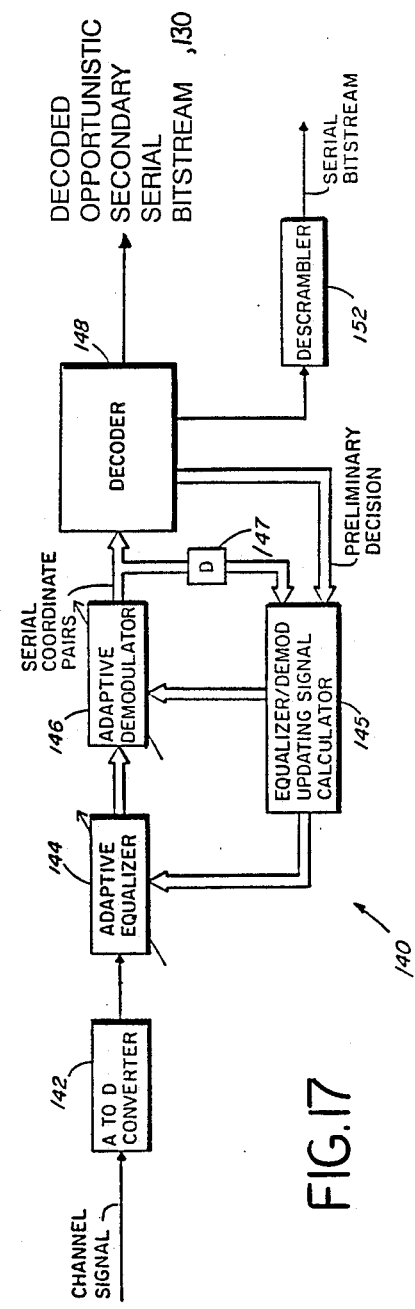

Referring to FIG. 17 in receiver 140, the received modulated carrier channel signal is passed through an A-to-D converter 142, an adaptive equalizer 144, and an adaptive demodulator 146. Equalized and demodulated coordinate pairs are delivered serially from demodulator 146 to a decoder 148. Decoder 148 feeds back preliminary decisions on the received coordinate pairs to equalizer/demodulator updating signal calculator 145. These preliminary decisions are processed in calculator 145 in a conventional manner to generate updating signals for the equalizer and demodulator. The preliminary decisions may be delayed. In that case, the demodulator output will be delayed accordingly by delay element 147 before it is sent to calculator 145. Decoder 148 after a delay of a number of signaling intervals, also delivers to descrambler 152 final decisions of scrambled information bits which were sent. The output of descrambler 152 is the original serial bitstream. Decoder 148 also returns the decoded opportunistic secondary serial bitstream 132, in the case of a Voronoi constellation with ties.

Decoder 148 is arranged, among other things, to decode a received signal to one of the points in the Voronoi constellation and to map each point back to an initial signal point x and thus a data word. The decoding and mapping may be done in the manner previously described.

Other embodiments are within the following claims.

I claim:

1. Apparatus for communicating data over a channel comprising
   an encoder for selecting a series of signal points from a constellation of available points, said constellation comprising points of a lattice $\Lambda$ (or a coset $\Lambda+c$, where c is a translation vector) that lie within a Voronoi region of a sublattice $\Lambda'$ of $\Lambda$, $\Lambda'$ being other than a scaled version of $\Lambda$, said constellation comprising more than $|\Lambda/\Lambda'|$ points, where $|\Lambda/\zeta'|$ is the order of the lattice partition $\Lambda/\Lambda'$, and
   a modulator for modulating a carrier on said channel in accordance with said selected series of signal points.

2. Apparatus for communicating data over a channel comprising
   an encoder for selecting a series of signal points from a constellation of available points, said constellation comprising points of a lattice $\Lambda$ (or a coset $\Lambda+c$, where c is a translation vector) that lie within a Voronoi region of a sublattice $\Lambda'$ of $\Lambda$, said lattices $\Lambda$ and $\Lambda'$ being of dimension greater than two, said constellation comprising more than $|\Lambda/\Lambda'|$ points, where $|\Lambda/\Lambda'|$ is the order of the lattice partition $\Lambda/\Lambda'$, and
   a modulator for modulating a carrier on said channel in accordance with said selected series of signal points.

3. Apparatus for communicating data over a channel comprising
   an encoder for selecting a series of signal points from a constellation of available points, said costellation comprising points of a lattice $\Lambda$ (or a coset $\Lambda+c$, where c is a translation vector) that lie within a Voronoi region of a sublattice $\Lambda'$ of $\Lambda$, $\Lambda'$ comprising a version of a binary lattice of depth at least two and normalized informativity less than one, and
   a modulator for modulating a carrier on said channel in accordance with said selected series of signal points.

4. The apparatus of claim 1, 2, or 3 wherein said constellation includes all points of said Voronoi region, including all boundary points in $\Lambda$ (or $\Lambda+c$).

5. The apparatus of claim 1, 2, or 3 wherein c is selected so that said constellation has a predetermined symmetry.

6. The apparatus of claim 5 wherein said symmetry is a rotational symmetry about the origin.

7. The apparatus of claim 6 wherein said rotational symmetry is three-way, four-way, or six-way.

8. The apparatus of claim 1, 2, or 3 wherein said encoder may encode at least one element of said data into any one of at least two different points of said constellation.

9. The apparatus of claim 8 wherein
   the result of said encoding is that said at least two different points occur with equal probability.

10. The apparatus of claim 8 wherein, when said one data element appears, said encoder chooses among said at least two different points based on a secondary stream of data, thereby providing an opportunistic secondary channel for said secondary stream.

11. The apparatus of claim 8 wherein said at least two different points lie on the boundary of said Voronoi region.

12. The apparatus of claim 1, 2, or 3 wherein sublattice $\Lambda'$ is of a different type from lattice $\Lambda$.

13. The apparatus of claim 1, 2, or 3 wherein said series of signal points is selected based on a coset code.

14. The apparatus of claim 1, 2, or 3 wherein said lattice $\Lambda$ is a version of an integer lattice $Z^N$, N an integer.

15. The apparatus of claim 1, 2, or 3 wherein said lattice $\Lambda$ is a ternary or quaternary lattice whose constituent 2D lattice is a version of the hexagonal lattice $\Lambda_2$.

16. The apparatus of claim 1 or 2 wherein said sublattice $\Lambda'$ is a version of the Schläfli lattice $D_4$.

17. The apparatus of claim 1, 2, or 3 wherein said constellation is 16-, 24-, or 32-dimensional.

18. The apparatus of claim 1, 2, or 3 wherein said sublattice $\Lambda$ has an 8-state or 16-state trellis diagram.

19. The apparatus of claim 1, 2, or 3 wherein said sublattice is based on a partition $E_8/RD_8^*$.

20. The apparatus of claim 1, 2, or 3 wherein said sublattice $\Lambda$ comprises the mod-2 lattice $H_{16}^* = \Lambda_{(16,5)}$, where (16,5) is a first-order Reed-Muller code.

21. The apparatus of claim 1, 2, or 3 wherein said sublattice $\Lambda'$ comprises the mod-2 lattice $X_{24}^* = \Lambda_{(24,6)}$.

22. The apparatus of claim 1, 2, or 3 wherein said sublattice $\Lambda'$ comprises the mod-2 lattice $\Lambda_{(32,7)}$.

23. A method of mapping from m data bits to a point drawn from a Voronoi constellation of more than $2^m$ points, based on an N-dimensional lattice partition $\Lambda/\Lambda'$, m and N being positive numbers, comprising
   mapping said m bits to one of $2^m$ initial signal points x, each said initial point x consisting of N coordinates $(x_1, \ldots, x_N)$, each coordinate taking on one of a predetermined set of values, the number of elements in all such sets of coordinate values not being identical, each initial point being a point in a coset of $\Lambda$ that belongs to a distinct equivalence class modulo $\Lambda'$,
   decoding said initial signal point x into a point $\lambda$ in $\Lambda$ with a minimum-distance decoder for $\Lambda$, and
   deriving the apparent error $e = x - \lambda$ (or a translate e-c of such apparent error, where c is a translation vector) as the said Voronoi constellation point.

24. The method of claim 23 wherein said point drawn from said constellation is used for transmission on a channel and is taken as said apparent error e if $\lambda$ is the unique closest point to x, or otherwise is selected from the set [e] of equivalent constellation points that are equally close to x.

25. In apparatus for quantizing a real N-tuple r comprising
   a minimum-distance decoder for finding the closest point $\lambda$ in an N-dimensional lattice $\Lambda'$ to r, N being a positive number, and
   means for indicating said closest point as a quantized representation of r, the improvement in which said lattice $\Lambda'$ is a binary lattice of depth at least 2 and normalized informatively less than one.

26. The improvement of claim 25 wherein said lattice is 16-, 24- or 32-dimensional.

27. The improvement of claim 25 wherein said lattice has an 8-state or 16-state trellis diagram.

28. The improvement of claim 25 wherein said lattice is based on a lattice partition $E_8/RD_8^*$.

29. The improvement of claim 25 wherein said lattice $\Lambda$ comprises the mod-2 lattice $H_{16}^* = \Lambda_{(16,5)}$.

30. The improvement of claim 25 wherein said lattice $\Lambda'$ comprises the mod-2 lattice $X_{24}^* = \Lambda_{(24,6)}$.

31. The improvement of claim 25 wherein said lattice $\Lambda'$ comprises the mod-2 lattice $\Lambda_{(32,7)}$.

* * * * *

UNITED STATES PATENT AND TRADEMARK OFFICE
CERTIFICATE OF CORRECTION

PATENT NO. : 4,959,842
DATED : September 25, 1990
INVENTOR(S) : G. David Forney, Jr.

Page 1 of 2

It is certified that error appears in the above-identified patent and that said Letters Patent is hereby corrected as shown below:

Column 3, line 29, "$\Lambda$" should be --$\Lambda'$--.

Column 3, lines 43, 44, "A" should be --$\Lambda$--.

Table 1, heading, "512" should be --partition--.

Column 9, line 38, "subjects" should be --subsets--.

Column 12, line 33, "82" should be --$\mu$--.

Column 15, line 44, "1" (third occurrence) should be -- -1 --.

Column 16, line 21, "as" is missing before --above--.

Column 16, line 55, "$\rho$" should be --$\kappa$--.

Column 19, claim 1, line 27, "$/\Lambda/\zeta^1/$" should be -- $/\Lambda/\Lambda^1/$ --.

Column 20, claim 20, line 33, "$\Lambda$" should be --$\Lambda'$--.

Column 22, claim 29, line 33, "$\Lambda$" should be --$\Lambda'$--.

UNITED STATES PATENT AND TRADEMARK OFFICE
CERTIFICATE OF CORRECTION

PATENT NO. : 4,959,842

DATED : September 25, 1990

INVENTOR(S) : G. David Forney, Jr.

It is certified that error appears in the above-identified patent and that said Letters Patent is hereby corrected as shown below:

Column 20, claim 20, line 33, "$A$" should be --$A'$--.

Column 22, claim 29, line 33, "$A$" should be --$A'$--.

Signed and Sealed this

Fifth Day of February, 1991

Attest:

HARRY F. MANBECK, JR.

*Attesting Officer*     Commissioner of Patents and Trademarks